United States Patent
Dai et al.

(10) Patent No.: US 10,869,324 B2
(45) Date of Patent: Dec. 15, 2020

(54) COMMUNICATION METHOD BASED ON A CU-DU ARCHITECTURE

(71) Applicant: HUAWEI TECHNOLOGIES CO., LTD., Shenzhen (CN)

(72) Inventors: Mingzeng Dai, Shanghai (CN); Henrik Olofsson, Kista (SE); Hongzhuo Zhang, Shanghai (CN); Xudong Yang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/441,557

(22) Filed: Jun. 14, 2019

(65) Prior Publication Data
US 2019/0297634 A1    Sep. 26, 2019

Related U.S. Application Data

(63) Continuation of application No. PCT/CN2018/085605, filed on May 4, 2018.

(30) Foreign Application Priority Data

May 5, 2017   (CN) .......................... 2017 1 0314208

(51) Int. Cl.
*H04W 4/00* (2018.01)
*H04W 72/12* (2009.01)
*H04W 28/16* (2009.01)

(52) U.S. Cl.
CPC ....... *H04W 72/1226* (2013.01); *H04W 28/16* (2013.01); *H04W 72/12* (2013.01)

(58) Field of Classification Search
CPC ................................................ H04W 36/0044
See application file for complete search history.

(56) References Cited

U.S. PATENT DOCUMENTS 6,374,112 B1 *  4/2002 Widegren ............. H04W 28/18
                                                  455/452.2
9,924,402 B2 *  3/2018 Klingenbrunn ... H04W 28/0226
(Continued)

FOREIGN PATENT DOCUMENTS

CN   101795442 A   8/2010
CN   106102106 A   11/2016
(Continued)

OTHER PUBLICATIONS

3GPP TS 23.501 V0.4.0 (Apr. 2017), "3rd Generation Partnership Project; Technical Specification Group Services and System Aspects; System Architecture for the 5G System; Stage 2 (Release 15)," Technical Specification, Apr. 2017, 124 pages.
(Continued)

*Primary Examiner* — Guang W Li
(74) *Attorney, Agent, or Firm* — Fish & Richardson P.C.

(57) ABSTRACT

This application provides a communication method and a communication system. A central unit (CU) obtains a quality of service (QoS) parameter of a QoS data flow and performs mapping the QoS data flow to a bearer based on the QoS parameter of the QoS data flow. The CU determines a QoS parameter of the bearer based on the QoS parameter of the QoS data flow and sends a context setup request message to a distributed unit (DU), wherein the context setup request message comprises the QoS parameter of the bearer, the QoS parameter of the QoS data flow and the mapping relationship between the QoS data flow and the bearer.

20 Claims, 14 Drawing Sheets

(56) References Cited

U.S. PATENT DOCUMENTS

| | | | | |
|---|---|---|---|---|
| 2007/0204050 | A1* | 8/2007 | Liu | H04L 47/14 709/230 |
| 2010/0208698 | A1* | 8/2010 | Lu | H04W 36/0027 370/331 |
| 2013/0163504 | A1* | 6/2013 | Jia | H04W 60/00 370/315 |
| 2014/0153504 | A1* | 6/2014 | Wang | H04L 47/40 370/329 |
| 2014/0226470 | A1* | 8/2014 | Kim | H04W 4/70 370/230 |
| 2016/0044722 | A1* | 2/2016 | Hapsari | H04W 28/24 370/329 |
| 2018/0083688 | A1* | 3/2018 | Agiwal | H04M 3/42229 |
| 2018/0152939 | A1* | 5/2018 | Lee | H04L 1/1812 |
| 2018/0192334 | A1* | 7/2018 | Wu | H04W 36/0033 |
| 2018/0192455 | A1* | 7/2018 | Wu | H04W 36/0022 |
| 2018/0213579 | A1* | 7/2018 | Hong | H04W 76/12 |
| 2018/0270713 | A1* | 9/2018 | Park | H04W 28/18 |
| 2018/0270894 | A1* | 9/2018 | Park | H04W 76/27 |
| 2018/0324631 | A1* | 11/2018 | Jheng | H04W 36/0022 |
| 2018/0324663 | A1* | 11/2018 | Park | H04W 36/08 |
| 2018/0338277 | A1* | 11/2018 | Byun | H04W 48/10 |
| 2018/0367675 | A1* | 12/2018 | Ni | H04L 12/14 |
| 2018/0368196 | A1* | 12/2018 | Gage | H04L 9/0816 |
| 2019/0045408 | A1* | 2/2019 | Kim | H04W 36/08 |
| 2019/0159072 | A1* | 5/2019 | Zhu | H04W 28/24 |
| 2019/0191353 | A1* | 6/2019 | Xiong | H04W 28/06 |
| 2019/0215735 | A1* | 7/2019 | Wang | H04W 28/16 |
| 2019/0223251 | A1* | 7/2019 | Jiang | H04W 76/19 |
| 2019/0394685 | A1* | 12/2019 | Sharma | H04W 36/0055 |
| 2020/0169913 | A1* | 5/2020 | Byun | H04W 28/02 |

FOREIGN PATENT DOCUMENTS

| | | | | |
|---|---|---|---|---|
| WO | 2010029827 | A1 | 3/2010 | |
| WO | 2012159321 | A1 | 11/2012 | |
| WO | WO-2018009340 | A1 * | 1/2018 | H04W 76/10 |
| WO | WO-2018170377 | A1 * | 9/2018 | H04W 80/00 |

OTHER PUBLICATIONS

3GPP TS 25.433 V14.0.0 (Jan. 2017), "3rd Generation Partnership Project; Technical Specification Group Radio Access Network; UTRAN Iub interface Node B Application Part (NBAP) signalling (Release 14)," Technical Specification, Jan. 2017, 1389 pages.

3GPP TS 38.300 V0.2.0 (May 2017), "3rd Generation Partnership Project;Technical Specification Group Radio Access Network; NG Radio Access Network; Overall Description; Stage 2 (Release 15)," Technical Specification, May 2017, 33 pages.

PCT International Search Report and Written Opinion issued in International Application No. PCT/CN2018/085605 dated Jul. 16, 2018, 13 pages. (partial English translation).

R2-1701205—Huawei et al., "QoS Flow to DRB Mapping," 3GPP TSG-RAN2 Meeting # 97, Revision of R2-1700088, Athens, Greece, Feb. 13-17, 2017, 6 pages.

R2-1702615—Huawei, "Lossless HO of QoS flow," 3GPP TSG-RAN2 Meeting #97bis, Spokane, Washington, USA, Apr. 3-7, 2017, 5 pages.

R2-1702637—Nokia et al., "QoS Parameters," 3GPP TSG-RAN WG2 Meeting #97bis, Spokane, USA, Apr. 3-7, 2017, 3 pages.

R3-170973—Iaesi et al., "Option 2 split with performant and reliable CU-DU connection," 3GPP TSG-RAN WG3 Meeting #95 bis, Spokane, USA, Apr. 3-7, 2017, 3 pages.

3GPP TR 38.801 V1.2.0 (Feb. 2017), "3rd Generation Partnership Project; Technical Specification Group Radio Access Network; Study on New Radio Access Technology; Radio Access Architecture and Interface (Release 14)," Feb. 2017, 90 pages.

Catt, "Consideration on the protocol stack and functions of CU/DC interface," 3GPP TSG RAN WG3 Meeting #95, R3-170382; Athens, Greece, Feb. 13-17, 2017, 4 pages.

Extended European Search Report issued in European Application No. 18794122.4 dated Feb. 18, 2020, 10 pages.

Huawei, "Data forwarding with QoS flow relocation," 3GPP TSG-RAN3 Meeting #95bis, R3-171072; Spokane, Washington, USA, Apr. 3-7, 2017, 6 pages.

LG Electronics Inc., "Transmission of RRC message via CU-DU interface," 3GPP TSG-RAN WG3 Meeting #95, R3-170405, Athens, Greece, Feb. 13-17, 2017, 4 pages.

3GPP TR 38.801 V1.2.0 (Feb. 2017), "3rd Generation Partnership Project;Technical Specification Group Radio Access Network; Study on New Radio Access Technology; Radio Access Architecture and Interfaces( Release 14)," (Feb. 2017), 90 pages.

Zte, "Discussion on CU-DU interface control plane functions," 3GPP TSG RAN WG3 Meeting #95bis, R3-171019, Spokane, USA, Apr. 3-7, 2017, 3 pages.

* cited by examiner

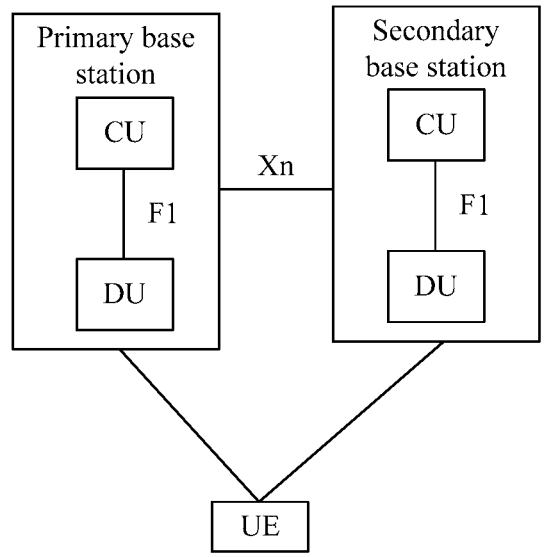

FIG. 5

| A distributed unit DU receives a QoS parameter of a bearer that is sent by a central unit CU, where the bearer is a bearer that is determined by the CU based on a QoS parameter of a QoS data flow and that has a mapping relationship with the QoS data flow, and the QoS parameter of the bearer is determined by the CU based on the QoS parameter of the QoS data flow | 610 |

| The DU schedules the bearer based on the QoS parameter of the bearer | 620 |

FIG. 6

COMMUNICATION METHOD BASED ON A CU-DU ARCHITECTURE

CROSS-REFERENCE TO RELATED APPLICATIONS

This application is a continuation of International Application No. PCT/CN2018/085605, filed on May 4, 2018, which claims priority to Chinese Patent Application No. 201710314208.4, filed on May 5, 2017. The disclosures of the aforementioned applications are hereby incorporated by reference in their entireties.

TECHNICAL FIELD

This application relates to the communications field, and more specifically, to a communication method, a base station, and a terminal device.

BACKGROUND

A concept of separating distributed unit (DU) from central unit (CU) is introduced in 5th Generation (5G) communications system. To be specific, a base station is divided into two parts: CU and DU.

SUMMARY

This application provides a communication method, a base station, and a terminal device, so that a DU can schedule a bearer based on a QoS parameter of the bearer.

According to a first aspect, a communication method is provided. The method includes: obtaining, by a central unit CU, a quality of service QoS parameter of a QoS data flow; determining, by the CU, mapping information between the QoS data flow and a bearer based on the QoS parameter of the QoS data flow; determining, by the CU, a QoS parameter of the bearer based on the QoS parameter of the QoS data flow; and sending, by the CU, the QoS parameter of the bearer to a distributed unit DU.

In this application, the CU determines the QoS parameter of the bearer and a mapping relationship between the QoS data flow and the bear. This conforms to a CU-DU function division trend. To be specific, both the QoS parameter of the bearer and the mapping relationship between the QoS data flow and the bear are determined at a service data adaptation protocol (SDAP) layer of the CU. This can keep consistency between the bearer and the QoS parameter of the bearer to the greatest extent, and helps the DU schedule the bearer based on the QoS parameter of the bearer.

With reference to the first aspect, in some implementations of the first aspect, the determining, by the CU, mapping information between the QoS data flow and a bearer based on the QoS parameter of the QoS data flow includes: determining, by the CU, the mapping information between the QoS data flow and the bearer by performing comparison on the QoS parameter of the QoS data flow.

For example, QoS data flows that have relatively similar QoS parameters may be mapped to a same bearer.

With reference to the first aspect, in some implementations of the first aspect, there is a mapping relationship between a first bearer and a plurality of data flows in the QoS data flow, and the determining, by the CU, a QoS parameter of the bearer based on the QoS parameter of the QoS data flow includes: selecting, by the CU, a QoS parameter of the first bearer from QoS parameters of the plurality of data flows; or calculating, by the CU, a QoS parameter of the first bearer based on QoS parameters of the plurality of data flows.

With reference to the first aspect, in some implementations of the first aspect, the sending, by the CU, the QoS parameter of the bearer to a DU includes: sending, by the CU, a first message to the DU, where the first message includes the QoS parameter of the bearer, and the first message is a bearer setup request message or a context setup request message.

With reference to the first aspect, in some implementations of the first aspect, the CU sends a bearer modification message to the DU, where the bearer modification message includes at least one of first information and second information, the first information is a modified QoS parameter of the bearer, and the second information is used to add a QoS data flow to the bearer or remove a QoS data flow from the bearer.

With reference to the first aspect, in some implementations of the first aspect, the determining, by the CU, mapping information between the QoS data flow and a bearer based on the QoS parameter of the QoS data flow includes: determining, by the CU at a Service Data Adaptation Protocol SDAP layer, the mapping information between the QoS data flow and the bearer.

With reference to the first aspect, in some implementations of the first aspect, the method further includes: obtaining, by the CU, a non-QoS-data-flow-level QoS parameter, where the non-QoS-data-flow-level QoS parameter includes any one of or a combination of a slice-level QoS parameter, a user equipment (UE)-level QoS parameter, and a packet data unit (PDU) session-level QoS parameter, and sending, by the CU, the non-QoS-data-flow-level QoS parameter to the DU; or obtaining, by the CU, a non-QoS-data-flow-level QoS parameter, where the non-QoS-data-flow-level QoS parameter includes any one of a slice-level QoS parameter, a UE-level QoS parameter, and a packet data unit PDU session-level QoS parameter, and controlling, by the CU, corresponding data transmission based on the non-QoS-data-flow-level QoS parameter.

According to a second aspect, a communication method is provided. The method includes: obtaining, by a central unit CU, a quality of service QoS parameter of a QoS data flow; determining, by the CU, mapping information between the QoS data flow and a bearer based on the QoS parameter of the QoS data flow; and sending, by the CU to a distributed unit DU, the QoS parameter of the QoS data flow and the mapping information between the QoS data flow and the bearer.

In this application, the DU can flexibly schedule the bearer based on the QoS parameter of the QoS data flow and the mapping information between the QoS data flow and the bearer. For example, a medium access control (MAC) layer of the DU can flexibly schedule the bearer based on information such as load, the QoS parameter of the QoS data flow, and the mapping information between the QoS data flow and the bearer.

With reference to the second aspect, in some implementations of the second aspect, the determining, by the CU, mapping information between the QoS data flow and a bearer based on the QoS parameter of the QoS data flow includes: determining, by the CU, the mapping information between the QoS data flow and the bearer by performing comparison on the QoS parameter of the QoS data flow.

With reference to the second aspect, in some implementations of the second aspect, the sending, by the CU to a DU, the QoS parameter of the QoS data flow and the mapping information between the QoS data flow and the bearer includes: sending, by the CU, a first message to the DU, where the first message includes the QoS parameter of the QoS data flow and the mapping information between the QoS data flow and the bearer, and the first message is a bearer setup request message or a context setup request message.

With reference to the second aspect, in some implementations of the second aspect, the method further includes: sending, by the CU, a bearer modification message to the DU, where the bearer modification message includes at least one of first information and second information, the first information is a modified QoS parameter of the bearer, and the second information is used to add a QoS data flow to the bearer or remove a QoS data flow from the bearer.

With reference to the second aspect, in some implementations of the second aspect, the determining, by the CU, mapping information between the QoS data flow and a bearer based on the QoS parameter of the QoS data flow includes: determining, by the CU at a Service Data Adaptation Protocol SDAP layer, the mapping information between the QoS data flow and the bearer.

With reference to the second aspect, in some implementations of the second aspect, the method further includes: obtaining, by the CU, a non-QoS-data-flow-level QoS parameter, where the non-QoS-data-flow-level QoS parameter includes any one of or a combination of a slice-level QoS parameter, a UE-level QoS parameter, and a packet data unit PDU session-level QoS parameter, and sending, by the CU, the non-QoS-data-flow-level QoS parameter to the DU; or obtaining, by the CU, a non-QoS-data-flow-level QoS parameter, where the non-QoS-data-flow-level QoS parameter includes any one of a slice-level QoS parameter, a UE-level QoS parameter, and a packet data unit PDU session-level QoS parameter, and controlling, by the CU, corresponding data transmission based on the non-QoS-data-flow-level QoS parameter.

According to a third aspect, a communication method is provided. The method includes: receiving, by a distributed unit DU, a QoS parameter of a bearer that is sent by a central unit CU, where the bearer is a bearer that is determined by the CU based on a QoS parameter of a QoS data flow and that has a mapping relationship with the QoS data flow, and the QoS parameter of the bearer is determined by the CU based on the QoS parameter of the QoS data flow; and scheduling, by the DU, the bearer based on the QoS parameter of the bearer.

In this application, the CU determines the QoS parameter of the bearer and the mapping relationship between the QoS data flow and the bear. This conforms to a CU-DU function division trend. To be specific, both the QoS parameter of the bearer and the mapping relationship between the QoS data flow and the bear are determined at an SDAP layer of the CU. This can keep consistency between the bearer and the QoS parameter of the bearer to the greatest extent, and helps the DU schedule the bearer based on the QoS parameter of the bearer.

With reference to the third aspect, in some implementations of the third aspect, the mapping information is determined by the CU by performing comparison on the QoS parameter of the QoS data flow.

With reference to the third aspect, in some implementations of the third aspect, the receiving, by a DU, a QoS parameter of a bearer that is sent by a CU includes: receiving, by the DU, a first message sent by the CU, where the first message includes the QoS parameter of the bearer, and the first message is a bearer setup request message or a context setup request message.

With reference to the third aspect, in some implementations of the third aspect, the method further includes: receiving, by the DU, a bearer modification message sent by the CU, where the bearer modification message includes at least one of first information and second information, the first information is a modified QoS parameter of the bearer, and the second information is used to add a QoS data flow to the bearer or remove a QoS data flow from the bearer.

With reference to the third aspect, in some implementations of the third aspect, the mapping information between the QoS data flow and the bearer is determined by the CU at a Service Data Adaptation Protocol SDAP layer.

With reference to the third aspect, in some implementations of the third aspect, the method further includes: receiving, by the DU, a non-QoS-data-flow-level QoS parameter sent by the CU, where the non-QoS-data-flow-level QoS parameter includes any one of or a combination of a slice-level QoS parameter, a UE-level QoS parameter, and a packet data unit PDU session-level QoS parameter; and controlling, by the DU, corresponding data transmission based on the non-QoS-data-flow-level QoS parameter.

According to a fourth aspect, a communication method is provided. The method includes: receiving, by a distributed unit DU, a QoS parameter of a QoS data flow and mapping information between the QoS data flow and a bearer, where the QoS parameter of the QoS data flow and the mapping information are sent by a central unit CU; and scheduling, by the DU, the bearer based on the QoS parameter of the QoS data flow and the mapping information between the QoS data flow and the bearer.

In this application, the DU can flexibly schedule the bearer based on the QoS parameter of the QoS data flow and the mapping information between the QoS data flow and the bearer. For example, a MAC layer of the DU can flexibly schedule the bearer based on information such as load, the QoS parameter of the QoS data flow, and the mapping information between the QoS data flow and the bearer.

With reference to the fourth aspect, in some implementations of the fourth aspect, the mapping information is determined by the CU by performing comparison on the QoS parameter of the QoS data flow.

With reference to the fourth aspect, in some implementations of the fourth aspect, there is a mapping relationship between the bearer and a plurality of data flows in the QoS data flow, and a QoS parameter of the bearer is selected by the CU from QoS parameters of the plurality of data flows, or a QoS parameter of the bearer is obtained by the CU through calculation based on QoS parameters of the plurality of data flows.

With reference to the fourth aspect, in some implementations of the fourth aspect, the receiving, by a DU, a QoS parameter of a QoS data flow and mapping information between the QoS data flow and the bearer, where the QoS parameter of the QoS data flow and the mapping information are sent by a CU includes: receiving, by the DU, a first message sent by the CU, where the first message includes the QoS parameter of the bearer and the mapping information between the QoS data flow and the bearer, and the first message is a bearer setup request message or a context setup request message.

With reference to the fourth aspect, in some implementations of the fourth aspect, the method further includes: receiving, by the DU, a bearer modification message sent by the CU, where the bearer modification message includes at least one of first information and second information, the first information is a modified QoS parameter of the bearer, and the second information is used to add a QoS data flow to the bearer or remove a QoS data flow from the bearer.

With reference to the fourth aspect, in some implementations of the fourth aspect, the mapping information between the QoS data flow and the bearer is determined by the CU at a Service Data Adaptation Protocol SDAP layer.

With reference to the fourth aspect, in some implementations of the fourth aspect, the method further includes: receiving, by the DU, a non-QoS-data-flow-level QoS parameter sent by the CU, where the non-QoS-data-flow-level QoS parameter includes any one of or a combination of a slice-level QoS parameter, a UE-level QoS parameter, and a packet data unit PDU session-level QoS parameter; and controlling, by the DU, corresponding data transmission based on the non-QoS-data-flow-level QoS parameter.

According to a fifth aspect, a communication method is provided. The method includes: obtaining, by UE, mapping information between a QoS data flow and a bearer, where the mapping information is determined by a CU based on a QoS parameter of the QoS data flow; and sending, by the UE, uplink data to a DU based on a mapping relationship between the QoS data flow and the bearer.

In this application, the mapping information between the QoS data flow and the bearer, based on which the UE transmits the uplink data, is determined by the CU based on the QoS parameter of the QoS data flow. This conforms to a CU-DU function division trend, and can ensure an effect of transmitting the uplink data by the UE.

With reference to the fifth aspect, in some implementations of the fifth aspect, the obtaining, by the UE, mapping information between a QoS data flow and a bearer includes: receiving, by the UE, a Radio Resource Control connection reconfiguration message sent by the DU; and obtaining, by the UE, the mapping relationship between the QoS data flow and the bearer from the Radio Resource Control connection reconfiguration message.

With reference to the fifth aspect, in some implementations of the fifth aspect, the UE receives a bearer modification message sent by the DU, where the bearer modification message includes at least one of first information and second information, the first information is a modified QoS parameter of the bearer, and the second information is used to add a QoS data flow to the bearer or remove a QoS data flow from the bearer; the UE determines the QoS parameter of the bearer based on the bearer modification message; and/or the UE adds a QoS data flow to the bearer or removes a QoS data flow from the bearer based on the bearer modification message.

According to a sixth aspect, a base station is provided. The base station includes a CU, and the CU includes modules configured to perform the method according to any one of the first aspect or the implementations of the first aspect.

According to a seventh aspect, a base station is provided. The base station includes a CU, and the CU includes modules configured to perform the method according to any one of the second aspect or the implementations of the second aspect.

According to an eighth aspect, a base station is provided. The base station includes a DU, and the DU includes modules configured to perform the method according to any one of the third aspect or the implementations of the third aspect.

According to a ninth aspect, a base station is provided. The base station includes a DU, and the DU includes modules configured to perform the method according to any one of the fourth aspect or the implementations of the fourth aspect.

According to a tenth aspect, a terminal device is provided. The terminal device includes modules configured to perform the method according to any one of the fifth aspect or the implementations of the fifth aspect.

According to an eleventh aspect, a communications apparatus is provided. The apparatus includes: a storage medium and a processor. The storage medium stores a computer executable program. The processor is connected to the storage medium, and executes the computer executable program to implement the method according to any one of the first aspect to the fifth aspect, or the implementations of the first aspect to the fifth aspect, or implement a part, in the method, that can be implemented by the processor.

The storage medium may be a nonvolatile storage medium.

According to a twelfth aspect, a computer readable medium is provided. The computer readable medium stores program code to be executed by a computer. The program code includes an instruction used to perform the method according to any one of the first aspect to the fifth aspect, or the implementations of the first aspect to the fifth aspect.

DESCRIPTION OF DRAWINGS

FIG. 5 is a schematic diagram of a scenario in which UE is handed over from a DU of a primary base station to a DU of a secondary base station;

FIG. 6 is a schematic flowchart of a communication method according to an embodiment of this application;

DESCRIPTION OF EMBODIMENTS

The following describes technical solutions of this application with reference to accompanying drawings.

The technical solutions of this application may be applied to a communications system using a CU-DU separation design, or a communications system having a similar design principle, for example, a Long Term Evolution (LTE) system, a 5th Generation (5G) communications system, or another communications system to which a CU-DU separation architecture is applicable.

This application relates to a terminal device. The terminal device may be a device that includes a radio sending/receiving function and that may cooperate with a network device to provide a communication service for a user. The terminal device may be referred to as user equipment (UE), an access terminal, a subscriber unit, a subscriber station, a mobile station, a mobile console, a remote station, a remote terminal, a mobile device, a user terminal, a terminal, or the like. A specific representation form of the terminal device may be an intelligent terminal, a personal digital assistant (PDA), a handheld device having a wireless communication function, an Internet of Things device, an in-vehicle device, a wearable device, or the like.

It may be understood that there are different service scenarios in a communications network, and a terminal device may be in corresponding forms in different service scenarios. This is not limited in this application.

For example, 5G includes three typical service scenarios. A first scenario is enhanced mobile broadband. In this application scenario, a peak network access rate for an intelligent terminal user needs to reach 10 Gbps or even 20 Gbps, to provide support for high-bandwidth applications such as virtual reality, ubiquitous video on-live and sharing, and anytime and anywhere cloud access. A second scenario is big-connection Internet of Things. In this scenario, a 5G network needs to support 1,000,000 human-things connections per square kilometer.

A third scenario is ultra-reliable and low latency communications. In this scenario, a latency of a 5G network is required to reach 1 millisecond, to provide strong support for low-latency services such as intelligent manufacturing, remote mechanical control, driver assistance, and automatic driving.

Figure 1:
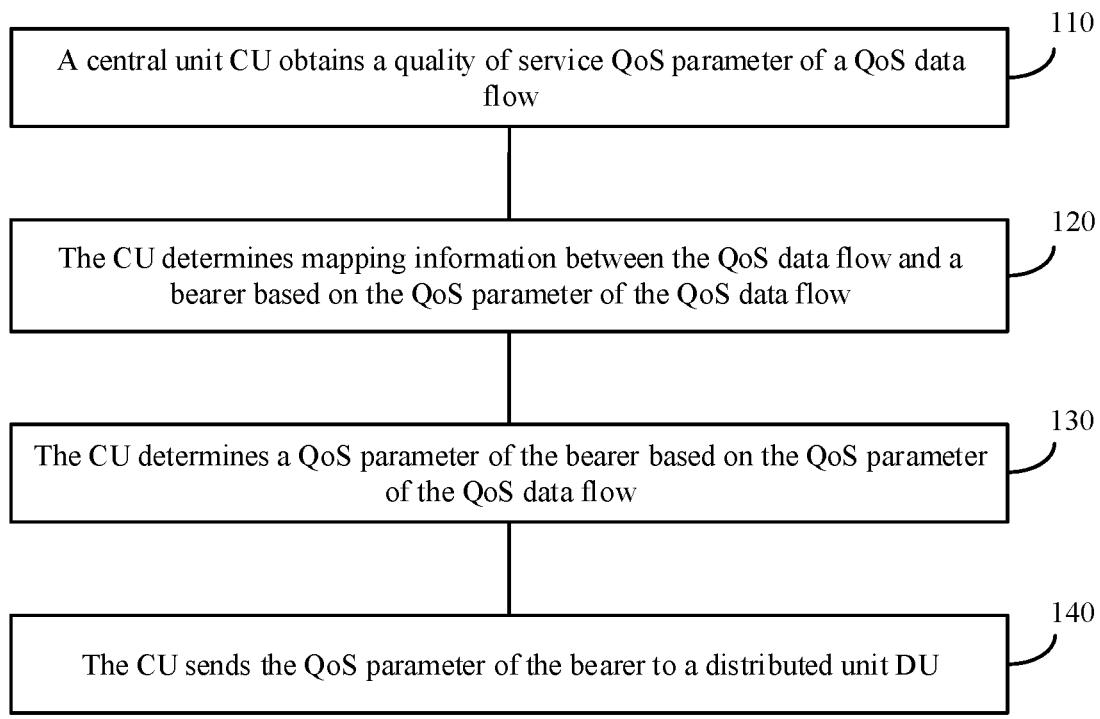
FIG. 1 is a schematic flowchart of a communication method according to an embodiment of this application.

FIG. 1 is a flowchart of a communication method 100 according to an embodiment of this application. Specific steps of the communication method 100 are as follows.

110. A CU obtains a QoS parameter of a QoS data flow.

This step has different implementations. Specific examples are as follows.

Manner 1:

The CU first receives a QoS data flow sent by a core network, and then obtains a QoS parameter of the QoS data flow.

Specifically, a user plane packet header of the QoS data flow includes a QoS data flow identifier (ID), and there is a correspondence between the QoS data flow ID and the QoS parameter of the QoS data flow.

Based on this, the CU can determine the QoS parameter of the QoS data flow based on the QoS data flow ID and the correspondence between the QoS data flow ID and the QoS parameter of the QoS data flow.

The correspondence between the QoS data flow ID and the QoS parameter of the QoS data flow may be preset on the CU, or may be provided by the core network. If the correspondence between the QoS data flow ID and the QoS parameter of the QoS data flow is provided by the core network, the CU may obtain the correspondence between the QoS data flow ID and the QoS parameter of the QoS data flow from a protocol data unit (PDU) session setup request sent by the core network.

Manner 2:

When the CU does not receive a QoS data flow sent by a core network, the CU may also obtain a QoS parameter of the QoS data flow.

For example, the CU obtains, from a PDU session setup request sent by the core network, a QoS data flow ID and a correspondence between the QoS data flow ID and the QoS parameter, so as to determine the QoS parameter of the QoS data flow based on the QoS data flow ID and the correspondence between the QoS data flow ID and the QoS parameter.

The QoS parameter of the QoS data flow may include the following parameters:

(1) 5G QoS class identifier (5QI);
(2) allocation and retention priority (ARP);
(3) guaranteed flow bit rate (GFBR); and
(4) maximum flow bit rate (MFBR).

The 5QI may specifically include: guaranteed bit rate (GBR) or non-guaranteed bit rate (non-GBR) type information, a priority level, a packet delay budget, and a packet error rate.

120. The CU determines mapping information between the QoS data flow and a bearer based on the QoS parameter of the QoS data flow.

The bearer may be a data radio bearer (DRB) or a radio bearer (RB). Specifically, a bearer between the CU and a DU may be an RB, and a bearer between the DU and UE may be a DRB.

It should be understood that the QoS data flow may include a plurality of data flows, and the bearer may also include a plurality of bearers. A mapping relationship, determined by the CU, between the QoS data flow and the bearer may be that a plurality of data flows are mapped to a plurality of bearers. In addition, different data flows may be mapped to one bearer, and one bearer may include one or more data flows.

With reference to specific examples, the following describes determining of the mapping relationship between the QoS data flow and the bearer based on the QoS parameter of the QoS data flow.

During the determining of the mapping relationship between the QoS data flow and the bearer, QoS data flows that have relatively similar QoS parameters may be mapped to a same bearer, and QoS data flows that have greatly different QoS parameters may be mapped to different bearers.

It should be understood that when the CU determines the mapping relationship between the QoS data flow and the bearer, the CU may specifically map the QoS data flow to the bearer at a service data adaptation protocol (SDAP) layer of the CU.

For example, the QoS data flow includes a first data flow, a second data flow, and a third data flow; the bearer includes a first bearer and a second bearer; and QoS parameters of the first data flow, the second data flow, and the third data flow are shown in Table 1. In Table 1, parameters of the first data flow and the second data flow are relatively similar (where packet error rates of the two data flows are the same, and packet delay budgets and priority levels are also similar).

However, parameters of the third data flow are greatly different from the parameters of the first data flow and the second data flow. Therefore, during the determining of the mapping relationship between the QoS data flow and the bearer, a mapping relationship shown in Table 2 may be obtained, where the first data flow and the second data flow are mapped to the first bearer, and the third data flow is mapped to the second bearer.

TABLE 1

| Parameter type | QoS parameter of the first data flow | QoS parameter of the second data flow | QoS parameter of the third data flow |
| --- | --- | --- | --- |
| GBR or non-GBR type information | Non-GBR | Non-GBR | GBR |
| Priority level | 3 | 4 | 6 |
| Packet delay budget | 200 ms | 210 ms | 300 ms |
| Packet error rate | 0.00001 | 0.00001 | 0.00001 |

TABLE 2

| QoS data flow | Mapped-to bearer |
| --- | --- |
| First data flow<br>Second data flow | First bearer |
| Third data flow | Second bearer |

It should be understood that Table 1 and Table 2 are merely used as examples herein to describe the determining of the mapping relationship between the QoS data flow and the bearer. Essentially, during the determining of the mapping relationship between the QoS data flow and the bearer, a main QoS parameter of the QoS data flow may be flexibly selected based on different application scenarios, so as to determine the mapping relationship between the QoS data flow and the bearer. For example, in an ultra-reliable and low latency communications scenario, if packet delay budgets of two QoS data flows are the same or relatively similar, the two QoS data flows may be mapped to one bearer. In addition, usually, when the CU determines the mapping relationship between the QoS data flow and the bearer, the CU may map a GBR-type data flow and a non-GBR-type QoS data flow to different bearers.

It should be understood that the mapping relationship between the QoS data flow and the bearer may be determined depending on whether the QoS parameters of the QoS data flows are the same or based on a degree of similarity between the QoS parameters of the QoS data flows, or may be determined based on another relationship between the QoS data flows (for example, whether the QoS data flows belong to a same session).

Further, the first data flow and the second data flow may be in a same PDU session, and the third data flow is in another PDU session. Specifically, as shown in Table 3, a first PDU session includes the first data flow and the second data flow, and a second PDU session includes the third data flow. It can be learned from Table 3 that data flows in different PDU sessions are corresponding to different bearers, the data flows in the first PDU session are mapped to the first bearer, and the data flow in the second PDU session is mapped to the second bearer.

TABLE 3

| PDU session | QoS data flow | Mapped-to bearer |
| --- | --- | --- |
| First PDU session | First data flow<br>Second data flow | First bearer |
| Second PDU session | Third data flow | Second bearer |

After determining the mapping relationship between the QoS data flow and the bearer, the CU may map the QoS data flow to the bearer based on the QoS parameter of the QoS data flow. The mapping, by the CU, the QoS data flow to the bearer may be specifically: mapping the QoS data flow to the bearer at the Service Data Adaptation Protocol (SDAP) layer of the CU.

130. The CU determines a QoS parameter of the bearer based on the QoS parameter of the QoS data flow.

It should be understood that the CU may determine the QoS parameter of the bearer based on the QoS parameter of the QoS data flow when determining the mapping relationship between the QoS data flow and the bearer; or the CU may determine the QoS parameter of the bearer based on the QoS parameter of the QoS data flow after determining the mapping relationship between the QoS data flow and the bearer.

A specific form of the QoS parameter of the bearer may be shown in Table 4.

TABLE 4

| Bearer |
| --- |
| > Identifier of the bearer<br>> QoS parameter of the bearer |

Because the CU has determined a mapping relationship between the first data flow and the first bearer and a mapping relationship between the second data flow and the first bearer, the CU may determine a QoS parameter of the first bearer based on the QoS parameter of the first data flow and the QoS parameter of the second data flow.

Specifically, the CU may determine, as the QoS parameter of the first bearer, a QoS parameter of the first data flow or the second data flow whose QoS parameter has a stricter requirement.

The 5G QCI is used as an example. As shown in Table 5, a packet delay budget of the first data flow is 200 ms, a packet delay budget of the second data flow is 250 ms, and therefore a packet delay budget of the first bearer is 200 ms. Other parameters are in a similar case.

TABLE 5

| Parameter type | QoS parameter of the first data flow | QoS parameter of the second data flow | QoS parameter of the first bearer |
| --- | --- | --- | --- |
| GBR or non-GBR type information | Non-GBR | Non-GBR | Non GBR |
| Priority level | 3 | 4 | 3 |
| Packet delay budget | 200 ms | 250 ms | 200 ms |
| Packet error rate | 0.00001 | 0.00001 | 0.00001 |

Alternatively, the CU may use, as the QoS parameter of the first bearer, a QoS parameter obtained by performing averaging operation processing on the QoS parameters of the first data flow and the second data flow. Details are shown in Table 6.

TABLE 6

| Parameter type | QoS parameter of the first data flow | QoS parameter of the second data flow | QoS parameter of the first bearer |
|---|---|---|---|
| GBR or non-GBR type information | GBR | GBR | GBR |
| Priority level | 2 | 4 | 3 |
| Packet delay budget | 200 ms | 300 ms | 250 ms |
| Packet error rate | 0.00001 | 0.00001 | 0.00001 |
| GFBR | 200 Mbps | 300 Mbps | 250 bps |
| MFBR | 500 Mbps | 500 Mbps | 500 Mbps |

When the CU maps the third data flow to the second bearer, because only the third data flow is mapped to the second bearer, the CU may directly determine the QoS parameter of the third data flow as a QoS parameter of the second bearer. Details are shown in Table 7.

TABLE 7

| Parameter type | QoS parameter of the third data flow | QoS parameter of the second bearer |
|---|---|---|
| GBR or non-GBR type information | GBR | GBR |
| Priority level | 2 | 2 |
| Packet delay budget | 200 ms | 200 ms |
| Packet error rate | 0.00001 | 0.00001 |
| GFBR | 200 Mbps | 200 bps |
| MFBR | 500 Mbps | 500 Mbps |

140. The CU sends the QoS parameter of the bearer to a distributed unit DU.

Function division for a base station (for example, an eNB in an LTE system or a gNB in an NR system) is discussed in an existing standard, to divide the base station into a CU and a DU. A relatively possible implementation is division based on functions of protocol stacks. A CU has functions of layers (including a PDCP layer, an RRC layer, and an SDAP layer) above the PDCP layer, and a DU has functions of layers (including an RLC layer, a MAC layer, and a PHY) below the PDCP layer. After receiving the QoS parameter of the bearer, the DU may schedule the bearer based on the QoS parameter of the bearer. It should be understood that the scheduling, by the DU, the bearer may be: controlling, by the DU, data transmission on the bearer.

The scheduling, by the DU, the bearer based on the QoS parameter of the bearer may be specifically:

(1) preferentially scheduling, by the DU, a bearer with a higher priority based on priority levels of bearers; and (2) controlling, by the DU, data transmission on the bearer based on a packet delay and a data packet error rate of the bearer, so that the data transmission on the bearer meets requirements on the packet delay and the data packet error rate.

A principle of scheduling, by the DU, the bearer based on another QoS parameter of the bearer is similar. Details are not described herein one by one.

In addition, it may be understood that from a perspective of a data flow direction, the scheduling, by the DU, the bearer may be classified into uplink data scheduling and downlink data scheduling.

Uplink data and downlink data scheduling processes are specifically as follows:

Downlink Data Scheduling:

The DU schedules downlink data on the bearer based on the QoS parameter of the bearer.

The DU preferentially schedules a bearer with a relatively higher priority level, and ensures that the requirements on the packet delay budget and the packet error rate are met for the bearer. Correspondingly, the UE detects downlink scheduling information by detecting a physical downlink control channel, and receives, on a corresponding physical downlink shared channel based on the downlink scheduling information, the downlink data sent by the DU.

Uplink Data Scheduling:

The UE requests, from the DU based on configuration information of the bearer, a resource for sending uplink data. For example, the UE sends a logical channel priority of the bearer and an amount of cached data to the DU. The DU generates an uplink (UL) grant based on the UE-reported logical channel priority of the bearer and amount of the cached data and the QoS parameter corresponding to the bearer, and sends the uplink grant to the UE through a physical downlink control channel. The UE sends the uplink data based on the received uplink grant.

In this application, the CU determines the QoS parameter of the bearer and the mapping relationship between the QoS data flow and the bear. This conforms to a CU-DU function division trend. To be specific, both the QoS parameter of the bearer and the mapping relationship between the QoS data flow and the bear are determined at the SDAP layer of the CU. This can keep consistency between the bearer and the QoS parameter of the bearer to the greatest extent, and helps the DU schedule the bearer based on the QoS parameter of the bearer.

Optionally, for step 140, a specific implementation of the sending, by the CU, the QoS parameter of the bearer to the DU may include: sending, by the CU, a first message to the DU, where the first message includes the QoS parameter of the bearer.

The following uses a bearer setup process and a bearer modification process to describe the sending, by the CU, a first message to the DU.

Manner 1: Bearer Setup Process

When the bearer has not been established, the CU may send a bearer setup request message to the DU, to establish the bearer.

In this embodiment of this application, the bearer setup request message is used to carry the QoS parameter of the bearer that is determined by the CU based on the QoS parameter of the QoS data flow, so as to implement transferring or indication of the foregoing content from the CU to the DU.

The bearer setup request message may include a configuration parameter of the bearer on the DU. After receiving the first message, the DU configures an L1/L2 layer on a DU side based on the configuration parameter of the bearer on the DU.

The bearer setup request message may further include UE-related configuration information of the bearer. The UE-related configuration information of the bearer may be carried in a Radio Resource Control connection reconfiguration message generated by the CU.

After receiving the bearer setup request message sent by the CU, the DU may further send, to the UE, the UE-related configuration information of the bearer that is in the bearer setup request message, so that the UE can configure the bearer based on the UE-related configuration information of the bearer, and establish the bearer between the DU and the UE. The UE-related configuration information of the bearer may be the radio resource control connection reconfiguration message generated by the CU.

After the bearer is established, the DU may send a bearer setup response message to the CU, to notify the CU that the bearer between the DU and the UE has been established. In other words, the method may further include: receiving, by the CU, a bearer setup response message sent by the DU.

It can be learned from the foregoing descriptions that the first message may be specifically the bearer setup request message, and a response message of the first message may be a bearer setup complete message.

Alternatively, the first message may be specifically a UE context setup request message, and a response message of the first message may be a UE context setup complete message. An implementation principle and process thereof are similar. Details are not described again.

It should be understood that if the bearer has been established in the manner 1, the bearer may be modified in the following manner 2, and a modified QoS parameter of the bearer is carried in a bearer modification process, so as to implement the transferring or indication of the foregoing content from the CU to the DU.

Manner 2: Bearer Modification Process

If the bearer has been established between the UE and the DU, the CU may send a bearer modification message to the DU to modify the bearer. Optionally, in an embodiment, the method 100 further includes: sending, by the CU, a second message to the DU, where the second message includes at least one of first information and second information, the first information is a modified QoS parameter of the bearer, and the second information is used to add a QoS data flow to the bearer or remove a QoS data flow from the bearer. In this case, the second message may be specifically the bearer modification message.

When the bearer modification message includes the first information, the DU may modify the QoS parameter of the bearer based on the first information. For example, the DU may modify an ARP of the bearer from a higher priority to a lower priority, or modify an ARP of the bearer from a lower priority to a higher priority.

When the bearer modification message includes the second information, the DU may modify, based on the second information, a data flow included in the bearer. Specifically, the DU may add a data flow to the bearer, or may remove a data flow from the bearer. For example, the first bearer includes the first data flow and the second data flow, and the CU sends a bearer modification message to the DU. After receiving the bearer modification message, the DU adds the third data flow to the data flows included in the first bearer; or after receiving the bearer modification message, the DU removes the second data flow from the first bearer, so that the first bearer includes only the first data flow.

In this application, the CU can flexibly modify the bearer by sending the second message to the DU.

The foregoing embodiment describes the determining, by the CU, the QoS parameter of the bearer and the mapping relationship between the QoS data flow and the bear, and the scheduling, by the DU, data based on the QoS parameter of the bearer.

It may be understood that in addition to data-flow-level QoS parameters, the QoS parameters further include a slice-level QoS parameter and a UE-level QoS parameter. These non-data-flow-level parameters may be placed in the first message.

Optionally, in an embodiment, the method 100 further includes: obtaining, by the CU, a non-data-flow-level QoS parameter; sending, by the CU, a first parameter to the DU; and controlling, by the DU based on the first parameter, data transmission of any one of a slice, UE, and a PDU session.

In addition to scheduling the bearer based on the QoS parameter of the bearer, the DU may further more precisely control transmission based on the non-data-flow-level QoS parameter.

It should be understood that the CU may send the first parameter to the DU, so that the DU controls corresponding data transmission based on the first parameter; or after obtaining the first parameter, the CU may directly control, based on the first parameter, the data transmission of the any one of the slice, the UE, and the PDU session.

The first parameter includes any one of or a combination of a slice-level QoS parameter, a UE-level QoS parameter, and a PDU session-level QoS parameter. When the first parameter includes a parameter at a specific level, the DU may control data transmission at the level based on the parameter at the level.

The following describes in detail the controlling, by the CU or the DU, corresponding data transmission based on the first parameter by using an example in which the first parameter includes an uplink PDU session aggregate maximum bit rate (AMBR) and a downlink PDU session AMBR.

When the first parameter includes the uplink PDU session AMBR, the CU controls an uplink data transmission rate of a PDU session based on the uplink PDU session AMBR, so that the uplink data transmission rate of the PDU session meets a requirement on the uplink PDU session AMBR, that is, a sum of UL data transmission rates of all DRBs in the PDU session does not exceed the uplink PDU session AMBR.

When the first parameter includes the uplink PDU session AMBR, the sending, by the CU, a first parameter to the DU is: sending the uplink PDU session AMBR to the DU. After receiving the uplink PDU session AMBR, the DU may control an uplink data transmission rate of a PDU session based on the uplink PDU session AMBR, so that the uplink data transmission rate of the PDU session meets a requirement on the uplink PDU session AMBR, that is, a sum of UL data transmission rates of all DRBs in the PDU session does not exceed the uplink PDU session AMBR.

When the first parameter includes the downlink PDU session AMBR, the sending, by the CU, a first parameter to the DU is: sending the downlink PDU session AMBR to the DU. After receiving the downlink PDU session AMBR, the DU may control a downlink data transmission rate of a PDU session based on the downlink PDU session AMBR, so that the downlink data transmission rate of the PDU session meets a requirement on the downlink PDU session AMBR, that is, a sum of DL data transmission rates of all DRBs in the PDU session does not exceed the downlink PDU session AMBR.

When the first parameter includes both the uplink PDU session AMBR and the downlink PDU session AMBR, the CU sends both the uplink PDU session AMBR and the downlink PDU session AMBR to the DU, so that the DU can control an uplink data transmission rate and a downlink data transmission rate of a PDU session based on the uplink PDU session AMBR and the downlink PDU session AMBR, the uplink data transmission rate of the PDU session meets a requirement on the uplink PDU session AMBR, and the downlink data transmission rate of the PDU session meets a requirement on the downlink PDU session AMBR, that is, a sum of UL data transmission rates of all DRBs in the PDU session does not exceed the uplink PDU session AMBR, and a sum of DL data transmission rates of all DRBs in the PDU session does not exceed the downlink PDU session AMBR.

A process of controlling, by the CU or the DU, corresponding data transmission based on a slice-level QoS parameter or a UE-level QoS parameter is similar to the foregoing control process. Details are not described herein again.

Figure 2:
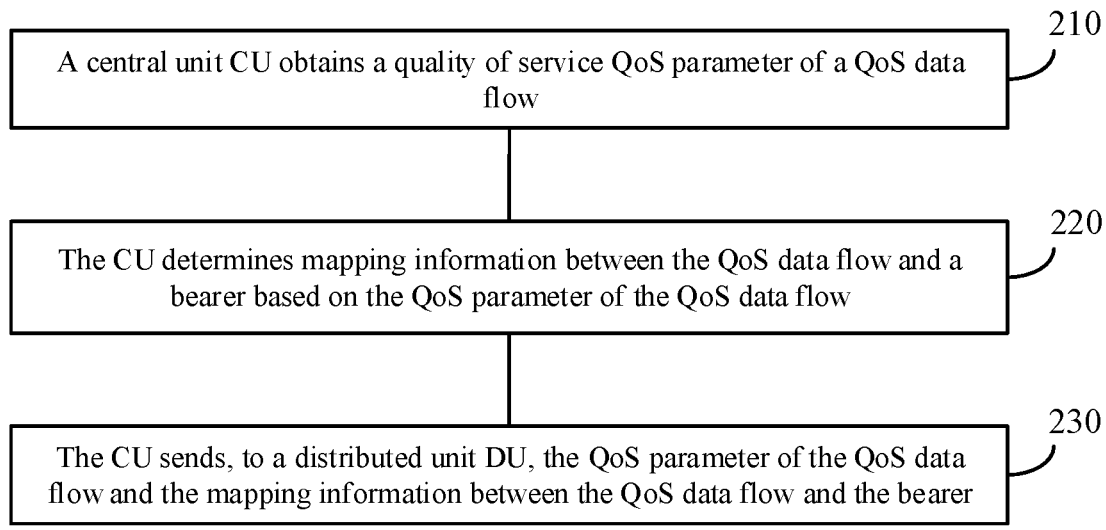
FIG. 2 is a schematic flowchart of a communication method according to an embodiment of this application.

FIG. 2 is a flowchart of a communication method 200 according to an embodiment of this application. Specific steps of the communication method 200 are as follows.

210. A CU obtains a QoS parameter of a QoS data flow.

220. The CU determines a mapping information between the QoS data flow and a bearer based on the QoS parameter of the QoS data flow.

It should be understood that step 210 and step 220 are the same as step 110 and step 120, and the foregoing descriptions of step 110 and step 120 are also applicable to step 210 and step 220. For brevity, repeated descriptions are properly omitted.

230. The CU sends, to a DU, the QoS parameter of the QoS data flow and the mapping information between the QoS data flow and the bearer.

The mapping information may be used to indicate a mapping relationship between the QoS data flow and the bearer. For example, a specific data flow is mapped to a specific bearer. A specific form of the mapping information may be shown in Table 8. Table 8 shows mapping information of a specific bearer. The mapping information of the bearer includes an identifier of the bearer and a QoS data flow included in the bearer.

TABLE 8

| Bearer |
| --- |
| > Identifier of the bearer |
| > List of an identifier of a QoS data flow included in the bearer |

Further, the mapping information of the bearer in Table 8 may further include a QoS parameter of the QoS data flow included in the bearer, as shown in Table 9.

TABLE 9

| Bearer |
| --- |
| > Identifier of the bearer |
| > List of an identifier of a QoS data flow included in the bearer |
| >> QoS parameter of the QoS data flow included in the bearer |

In this application, the DU can flexibly schedule the bearer based on the QoS parameter of the QoS data flow and the mapping information between the QoS data flow and the bearer. For example, a medium access control (MAC) layer of the DU can flexibly schedule the bearer based on information such as load, the QoS parameter of the QoS data flow, and the mapping information between the QoS data flow and the bearer.

Specifically, when the bearer includes a relatively small quantity of QoS data flows or the QoS data flows have relatively similar QoS parameters, the CU may directly schedule the bearer based on the QoS parameters of the QoS data flows included in the bearer. However, when the bearer includes a relatively large quantity of QoS data flows or the QoS data flows have greatly different QoS parameters, the CU may generate a QoS parameter of the bearer based on the QoS parameters of the QoS data flows, and then schedule the bearer based on the QoS parameter of the bearer.

Optionally, the method 100 and the method 200 are also applicable to a CU/DU handover scenario.

Figure 3:
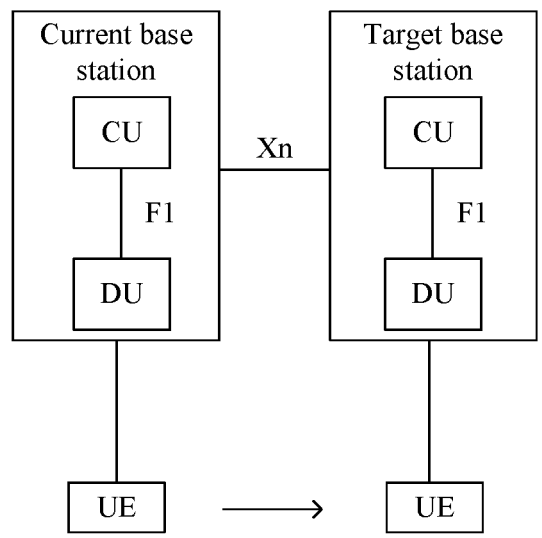
FIG. 3 is a schematic diagram of a scenario in which UE is handed over from a current base station to a target base station.
Figure 4:
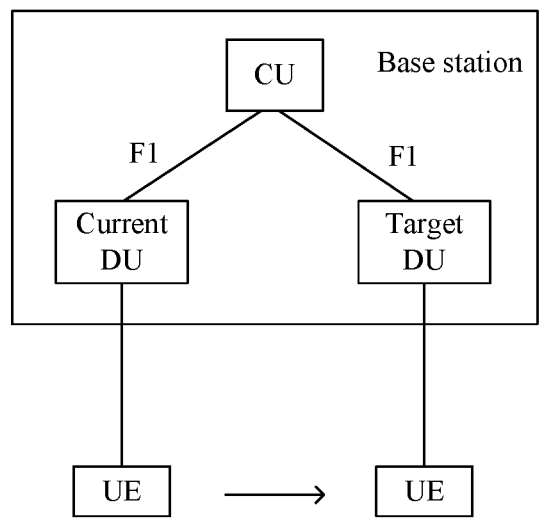
FIG. 4 is a schematic diagram of a scenario in which UE is handed over from a current DU of a base station to a target DU.

With reference to FIG. 3 and FIG. 4, the following describes in detail two scenarios: inter-base-station handover and intra-base-station handover.

Scenario 1: Inter-Base-Station Handover

As shown in FIG. 3, when UE needs to be handed over from a current base station to a target base station, for the method 100, the current base station may send, to the target base station, a mapping relationship between a QoS data flow and a bearer and a CU-determined QoS parameter of the bearer, so that a target DU can schedule the bearer based on the information.

Specifically, the current base station includes a current CU and a current DU, and the target base station includes a target CU and the target DU. The current CU may send, to the target CU through an Xn interface, the mapping relationship between the QoS data flow and the bearer and the CU-determined QoS parameter of the bearer. Then, the target CU sends the mapping relationship and the QoS parameter of the bearer to the target DU through an F1 interface, so that the target DU can schedule the bearer based on the information. For example, the current CU sends a handover request message to the target CU, where the handover request message includes the mapping relationship between the QoS data flow and the bearer and the CU-determined QoS parameter of the bearer.

As shown in FIG. 3, when UE needs to be handed over from a current base station to a target base station, for the method 200, the current base station may send, to the target base station, a mapping relationship between a QoS data flow and a bearer and a QoS parameter of the QoS data flow, so that a target DU can schedule the bearer based on the information.

Specifically, the current base station includes a current CU and a current DU, and the target base station includes a target CU and the target DU. The current CU may send, to the target CU through an Xn interface, the mapping relationship between the QoS data flow and the bearer and the QoS parameter of the QoS data flow. Then, the target CU sends the mapping relationship and the QoS parameter of the QoS data flow to the target DU through an F1 interface, so that the target DU can schedule the bearer based on the information. For example, the current CU sends a handover request message to the target CU, where the handover request message includes the mapping relationship between the QoS data flow and the bearer and the QoS parameter of the QoS data flow.

Scenario 2: Intra-Base-Station Handover Between DUs

As shown in FIG. 4, when UE needs to be handed over from a current DU to a target DU, for the method 100, a CU may send, to the target DU through an F1 interface, a mapping relationship between a QoS data flow and a bearer and a CU-determined QoS parameter of the bearer, so that the target DU can schedule the bearer based on the information. For example, the CU sends a UE context setup request message to the target DU, where the UE context setup request message includes the mapping relationship between the QoS data flow and the bearer and the CU-determined QoS parameter of the bearer.

As shown in FIG. 4, when UE needs to be handed over from a current DU to a target DU, for the method 200, a CU may send, to the target DU through an F1 interface, a mapping relationship between a QoS data flow and a bearer and a QoS parameter of the QoS data flow, so that the target DU can schedule the bearer based on the information. For example, the CU sends a UE context setup request message to a target DU, where the UE context setup request message includes the mapping relationship between the QoS data flow and the bearer and the QoS parameter of the QoS data flow.

In addition, the method 100 and the method 200 may also be applicable to a dual connectivity (DC) scenario.

As shown in FIG. 5, when UE retains connections to both a primary base station and a secondary base station, the primary base station sends, to the secondary base station, a mapping relationship between a QoS data flow and a bearer and a CU-determined QoS parameter of the bearer, so that the secondary base station can schedule the bearer based on the information. For example, the primary base station sends a secondary base station add message to the secondary base station, where the secondary base station add message includes the mapping relationship between the QoS data flow and the bearer and the QoS parameter of the bearer that is determined by the primary base station.

Specifically, a CU of the primary base station may send, to a CU of the secondary base station through an Xn interface, the mapping relationship between the QoS data flow and the bearer and the QoS parameter of the bearer that is determined by the CU of the primary base station. Then, the CU of the secondary base station sends the information to a DU of the secondary base station through an F1 interface, so that the DU of the secondary base station can schedule the bearer based on the information.

As shown in FIG. 5, when UE retains connections to both a primary base station and a secondary base station, the primary base station may send, to the secondary base station, a mapping relationship between a QoS data flow and a bearer and a QoS parameter of the QoS data flow, so that the secondary base station can schedule the bearer based on the information. For example, the primary base station sends a secondary base station add message to the secondary base station, where the secondary base station add message includes the mapping relationship between the QoS data flow and the bearer and the QoS parameter of the QoS data flow.

Specifically, a CU of the primary base station may send, to a CU of the secondary base station through an Xn interface, the mapping relationship between the QoS data flow and the bearer and the QoS parameter of the QoS data flow. Then, the CU of the secondary base station sends the information to a DU of the secondary base station through an F1 interface, so that the DU of the secondary base station can schedule the bearer based on the information.

Figure 7:
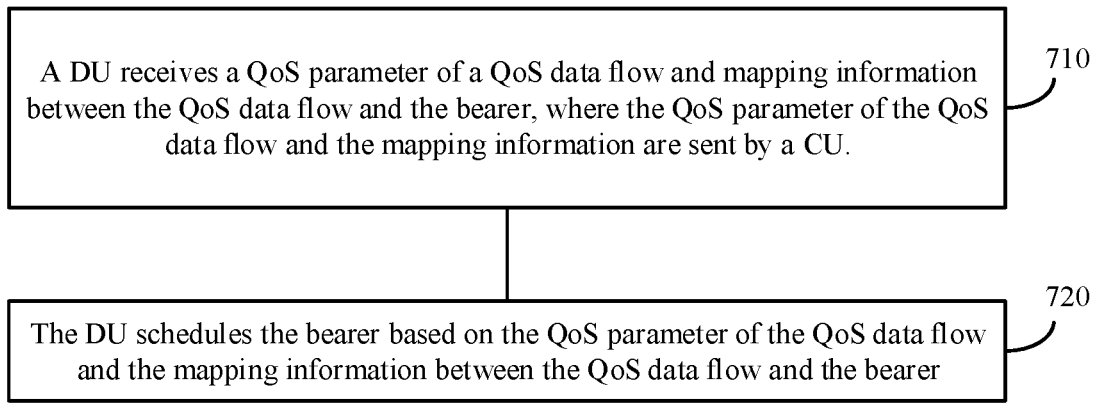
FIG. 7 is a schematic flowchart of a communication method according to an embodiment of this application.

The foregoing describes the communication methods in the embodiments of this application from a perspective of a CU with reference to FIG. 1 and FIG. 2. The following describes communication methods in the embodiments of this application from a perspective of a DU with reference to FIG. 6 and FIG. 7. It should be understood that the communication methods in FIG. 6 and FIG. 7 are corresponding to the communication methods in FIG. 1 and FIG. 2 respectively. For brevity, repeated descriptions are properly omitted.

FIG. 6 is a flowchart of a communication method 600 according to an embodiment of this application. Specific steps of the communication method 600 are as follows:

610. A distributed unit DU receives a QoS parameter of a bearer that is sent by a central unit CU, where the bearer is a bearer that is determined by the CU based on a QoS parameter of a QoS data flow and that has a mapping relationship with the QoS data flow, and the QoS parameter of the bearer is determined by the CU based on the QoS parameter of the QoS data flow.

620. The DU schedules the bearer based on the QoS parameter of the bearer.

In this application, the QoS parameter of the bearer, based on which the DU schedules the bearer, is determined when the CU determines the mapping relationship between the QoS data flow and the bear. This can keep consistency between the bearer and the QoS parameter of the bearer, and can improve an effect of scheduling the bearer by the DU.

FIG. 7 is a flowchart of a communication method 700 according to an embodiment of this application. Specific steps of the communication method 700 are as follows:

710. A distributed unit DU receives a QoS parameter of a QoS data flow and mapping information between the QoS data flow and the bearer, where the QoS parameter of the QoS data flow and the mapping information are sent by a central unit CU.

720. The DU schedules the bearer based on the QoS parameter of the QoS data flow and the mapping information between the QoS data flow and the bearer.

In this application, the DU can schedule the bearer based on the QoS parameter of the QoS data flow and the mapping information between the QoS data flow and the bearer. The DU may directly schedule the bearer based on a QoS-data-flow-level QoS parameter; or may convert the QoS parameter of the QoS data flow into a bearer-level QoS parameter, and then schedule the bearer. Compared with a manner of scheduling a bearer based only on a QoS parameter of the bearer, this improves flexibility for scheduling a bearer.

Optionally, in an embodiment, in the method 600 and the method 700, the mapping information is determined by the CU based on a result of comparison on the QoS parameter of the QoS data flow.

Optionally, in an embodiment, in the method 600 and the method 700, there is a mapping relationship between the bearer and a plurality of data flows in the QoS data flow, and the QoS parameter of the bearer is selected by the CU from QoS parameters of the plurality of data flows, or the QoS parameter of the bearer is obtained by the CU through calculation based on QoS parameters of the plurality of data flows.

Optionally, in an embodiment, the method 600 and the method 700 further include: receiving, by the DU, a first message sent by the CU, where the first message includes the QoS parameter of the bearer and/or the mapping information between the QoS data flow and the bearer; and establishing, by the DU, the bearer between the DU and user equipment UE based on the first message.

Optionally, in an embodiment, the method 600 and the method 700 further include: receiving, by the DU, a first message sent by the CU, where the first message includes the QoS parameter of the QoS data flow and/or the mapping information between the QoS data flow and the bearer; and establishing, by the DU, the bearer between the DU and user equipment UE based on the first message.

Optionally, in an embodiment, the method 600 and the method 700 further include: receiving, by the DU, a bearer modification message sent by the CU, where the bearer modification message includes at least one of first information and second information, the first information is a modified QoS parameter of the bearer, and the second information is used to add a QoS data flow to the bearer or remove a QoS data flow from the bearer.

Optionally, in an embodiment, in the method 600 and the method 700, the mapping information between the QoS data flow and the bearer is determined by the CU at a Service Data Adaptation Protocol SDAP layer.

Optionally, in an embodiment, the method 600 and the method 700 further include: receiving, by the DU, a non-QoS-data-flow-level QoS parameter sent by the CU, where the non-QoS-data-flow-level QoS parameter includes any one of a slice-level QoS parameter, a UE-level QoS parameter, and a packet data unit PDU session-level QoS parameter; and controlling, by the DU based on the non-QoS-data-flow-level QoS parameter, data transmission of any one of a slice, a UE, and a PDU session.

Figure 8:
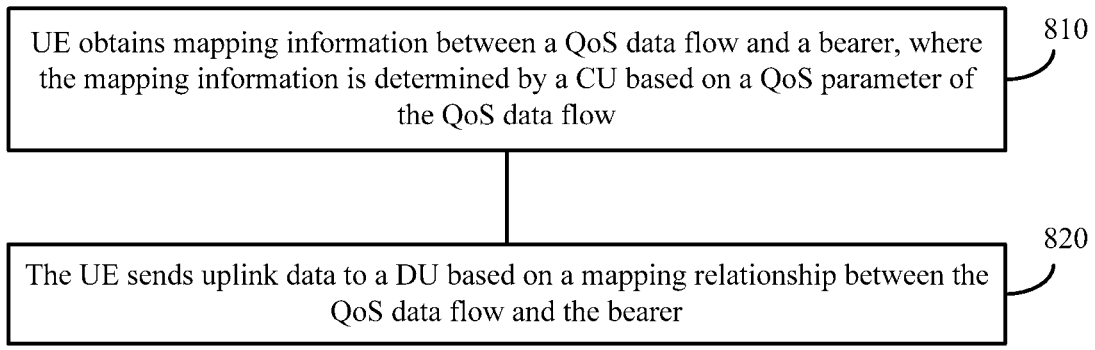
FIG. 8 is a schematic flowchart of a communication method according to an embodiment of this application.

The foregoing describes the communication methods in the embodiments of this application from the perspective of the DU with reference to FIG. 6 and FIG. 7. The following describes a communication method in the embodiments of this application from a perspective of UE with reference to FIG. 8. It should be understood that the communication method in FIG. 8 is corresponding to the communication methods in FIG. 6 and FIG. 7. For brevity, repeated descriptions are properly omitted.

FIG. 8 is a flowchart of a communication method 800 according to an embodiment of this application. Specific steps of the communication method 800 are as follows:

810. UE obtains mapping information between a QoS data flow and a bearer, where the mapping information is determined by a CU based on a QoS parameter of the QoS data flow.

820. The UE sends uplink data to a DU based on a mapping relationship between the QoS data flow and the bearer.

In this application, the mapping information between the QoS data flow and the bearer, based on which the UE transmits the uplink data, is determined by the CU based on the QoS parameter of the QoS data flow. This conforms to a CU-DU function division trend, and can ensure an effect of transmitting the uplink data by the UE.

Optionally, in an embodiment, the obtaining, by UE, mapping information between a QoS data flow and a bearer includes: receiving, by the UE, a radio resource control connection reconfiguration message sent by the DU; and obtaining, by the UE, the mapping relationship between the QoS data flow and the bearer from the radio resource control connection reconfiguration message.

Optionally, in an embodiment, the method 800 further includes: receiving, by the UE, a bearer modification message sent by the DU, where the bearer modification message includes at least one of first information and second information, the first information is a modified QoS parameter of the bearer, and the second information is used to add a QoS data flow to the bearer or remove a QoS data flow from the bearer; determining, by the UE, the QoS parameter of the bearer based on the bearer modification message; and/or adding, by the UE, a QoS data flow to the bearer or removing a QoS data flow from the bearer based on the bearer modification message.

The following describes in detail communication methods in the embodiments of this application with reference to FIG. 9 to FIG. 12. The communication methods in FIG. 9 to FIG. 12 may be implemented by a device such as the CU, the DU, or the UE in the foregoing descriptions.

Figure 9:
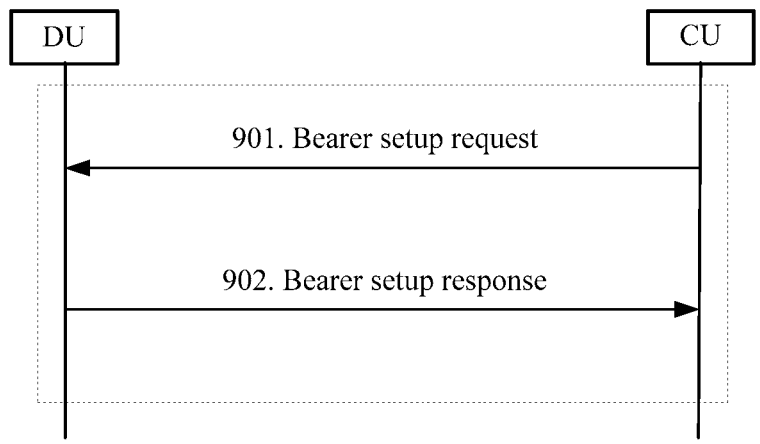
FIG. 9 is a schematic flowchart of a communication method according to an embodiment of this application.

FIG. 9 is a flowchart of a communication method according to an embodiment of this application. The method in FIG. 9 includes the following steps.

901. A CU sends a bearer setup request to a DU.

The bearer setup request may include the following information: a list of to-be-setup DRB, where the list includes a DRB ID and a QoS parameter of the to-be-setup DRB, a mapping relationship between a QoS data flow and the to-be-setup DRB, and a tunnel endpoint identifier (TEID) of the CU.

After obtaining the bearer setup request, the CU may first determine the DRB that needs to be established, and then maps the QoS data flow to the corresponding DRB based on the tunnel endpoint identifier of the CU and the mapping relationship between the QoS data flow and the DRB.

Specifically, the bearer setup request may specifically include information shown in Table 10.

TABLE 10

| Bearer setup list |
|---|
| > Identifier of a PDU session to which a bearer belongs |
| >> QoS parameter of the PDU session (a PDU session AMBR) |
| >>> Identifier of a DRB |
| >>> List of a QoS flow included in the DRB |
| >>>> QoS parameter of the QoS flow |
| >>>> QoS parameter of the DRB |
| >>>> Uplink transmission link address of the DRB |
| UE-related configuration information of the DRB |
| Configuration parameter of the DRB on the DU |

902. The DU sends a bearer setup response to the CU.

The bearer setup response may include a list of DRB which is established, and the list includes a DRB ID and a DRB TEID of the DRB that has been successfully established. In addition, the bearer setup response may further include a list of DRB which failed to be established, and the list includes a DRB ID of the DRB subject to the bearer setup failure and a cause of the DRB setup failure.

The CU sends the bearer setup request to the DU, so that the DU can establish a DRB between UE and the DU, and after the DRB is established, the DU feeds back to the CU that the DRB has been established.

Figure 10A:
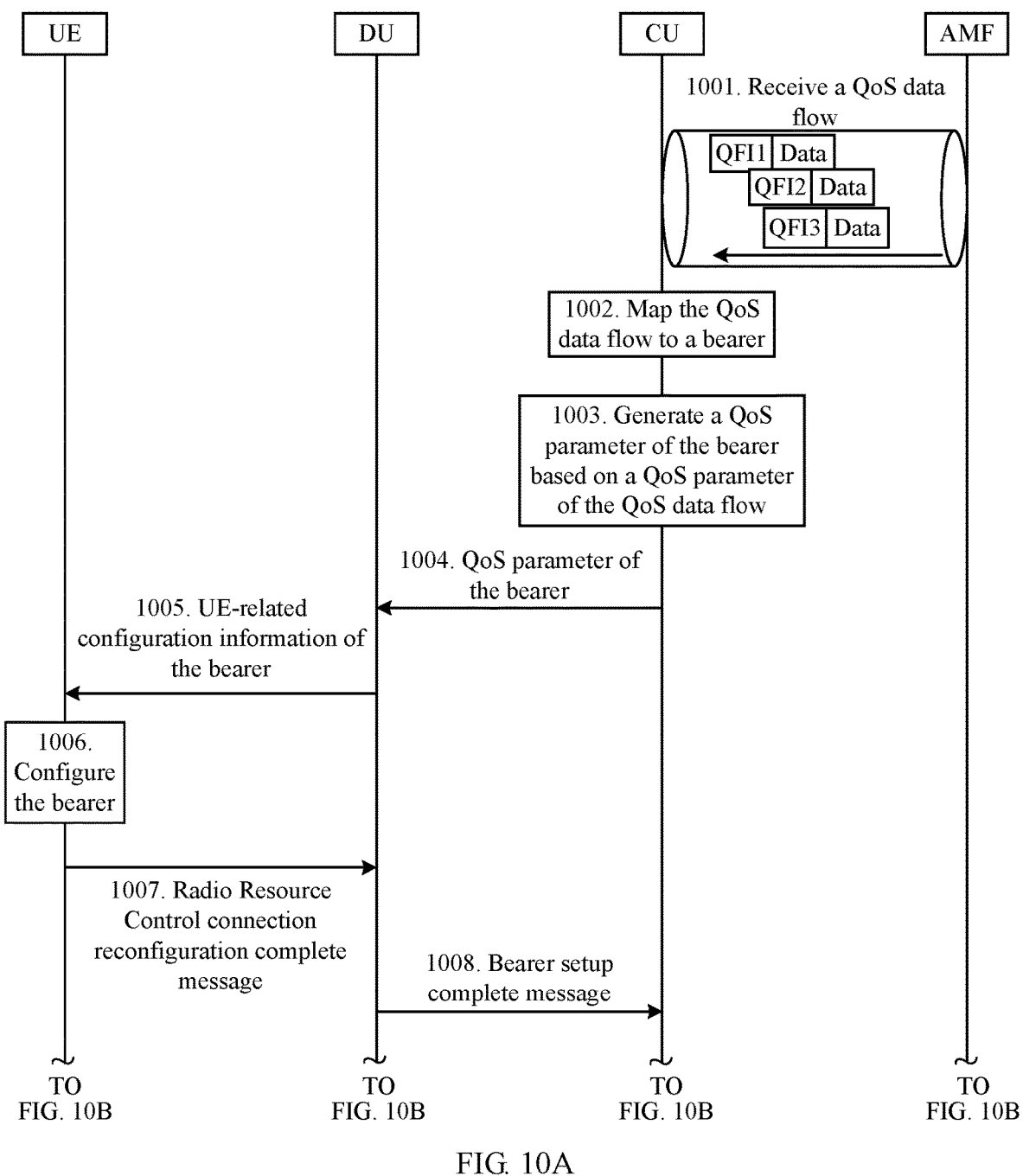
FIG. 10A and FIG. 10B are a flowchart of a communication method according to an embodiment of this application.
Figure 10B:
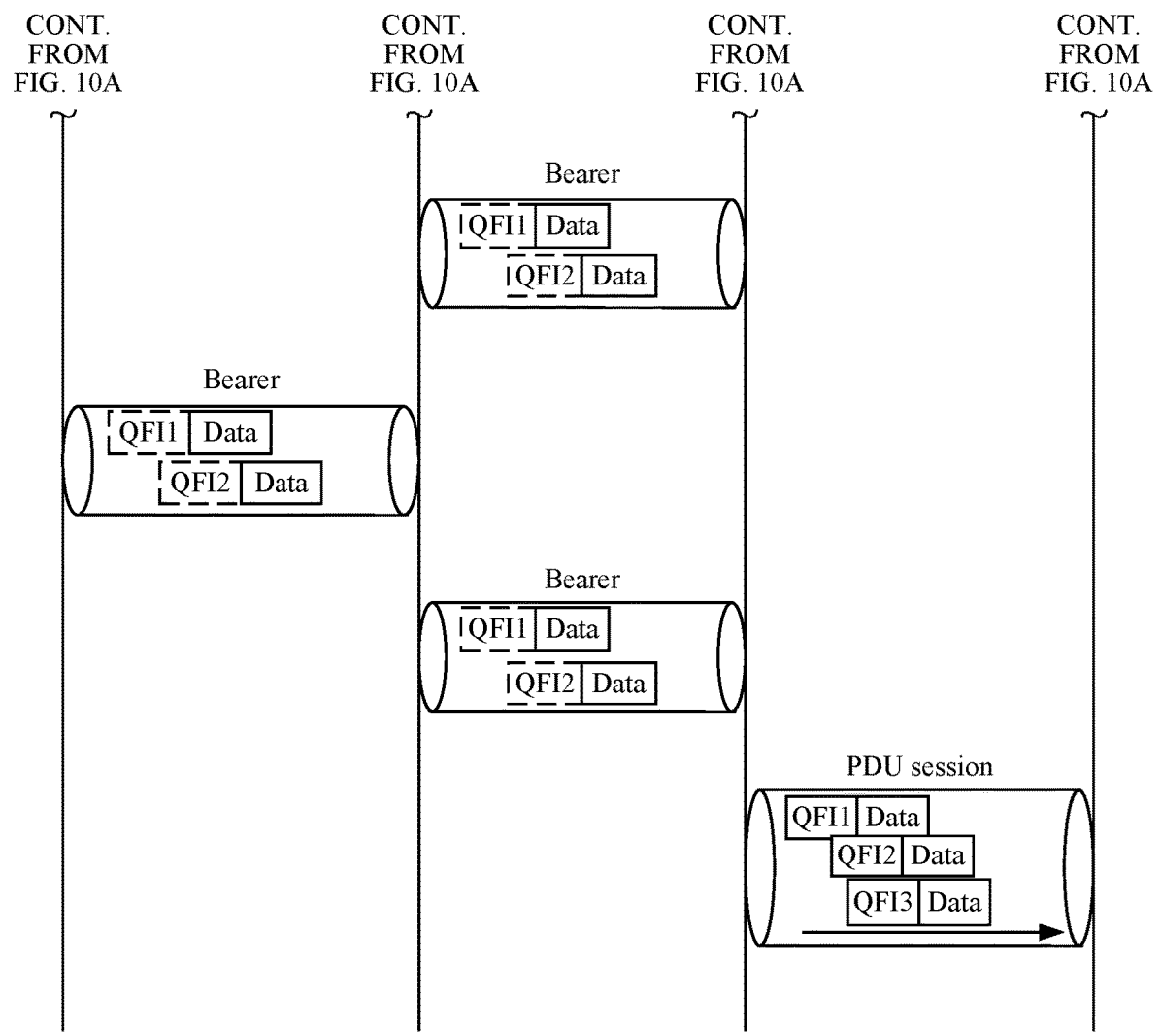

FIG. 10A and FIG. 10B are a flowchart of a communication method according to an embodiment of this application. The method in FIG. 10A and FIG. 10B includes the following steps.

1001. A CU receives a QoS data flow sent by an access and mobility management function (AMF) unit.

Specifically, the CU obtains the QoS data flow through a PDU session. The QoS data flows include three data flows. The three data flows are a flow 1, a flow 2, and a flow 3. The three data flows include QoS data flow IDs (a QFI1, a QFI2, and a QFI3) and corresponding data.

1002. The CU maps a flow 1 and a flow 2 to a bearer 1, and maps a flow 3 to a bearer 2.

Optionally, the CU may map, to a same bearer, QoS data flows that have similar QoS parameters. Therefore, when a QoS parameter of the flow 1 and a QoS parameter of the flow 2 are relatively similar, and a QoS parameter of the flow 3 is greatly different from the QoS parameter of the flow 1 and the QoS parameter of the flow 2, the flow 1 and the flow 2 may be mapped to a same bearer, and the flow 3 is mapped to another bearer. In other words, one bearer may include one QoS data flow, or may include a plurality of QoS data flows. In addition, mapping, by the CU, the QoS data flows to the bearers may be specifically implemented by an SDAP layer of the CU.

1003. The CU generates a QoS parameter of the bearer 1 based on QoS parameters of the flow 1 and the flow 2, and generates a QoS parameter of the bearer 2 based on a QoS parameter of the flow 3.

Before generating the QoS parameters of the bearers based on the QoS data flows, the CU may first determine the QoS parameters of the QoS data flows. Specifically, the CU may determine the QoS parameters of the QoS data flows based on the QoS data flow IDs and a correspondence between QoS data flow IDs and QoS parameters. The correspondence between the QoS data flow IDs and the QoS parameters may be preset on the CU, or may be carried in a PDU session setup request initiated by a core network to a DU, or may be stipulated in a communication standard.

In addition, when determining QoS parameters of a plurality of bearers based on QoS parameters of a plurality of QoS data flows, the CU may select, from the QoS parameters of the plurality of QoS data flows based on parameter values of the QoS parameters, QoS parameters with strictest parameter values as the QoS parameters of the bearers. Specifically, it is assumed that the flow 1 and the flow 2 are mapped to the bearer 1, and the flow 3 is mapped to the bearer 2. When the CU generates the QoS parameter of the bearer 1 based on the QoS parameters of the flow 1 and the flow 2, the CU may select, from the QoS parameters of the flow 1 and the flow 2, a QoS parameter with a strictest parameter value as the QoS parameter of the bearer 1; or may use, as the QoS parameter of the bearer 1, a QoS parameter obtained by performing averaging on the QoS parameters of the flow 1 and the flow 2. When the CU generates the QoS parameter of the bearer 2 based on the QoS parameter of the flow 3, the CU may directly use the QoS parameter of the flow 3 as the QoS parameter of the bearer 2.

1004. The CU sends the QoS parameters of the bearers to a DU.

Specifically, the QoS parameters of the bearers may be carried in a bearer setup request message or a UE context setup request message sent by the CU.

If no bearer has been established between the DU and UE, the CU may send the bearer setup request message to the DU, so that the DU establishes a bearer between the DU and the UE.

In a case of initial bearer setup, the CU sends the UE context setup request message to the DU.

The bearer setup request message or the UE context setup request message may include the QoS parameters of the bearers that are generated based on the QoS parameters of the QoS data flows, configuration parameters of the bearers on the DU, UE-related configuration information of the bearers, uplink transmission link addresses of the bearers, and the like. The uplink transmission link addresses of the bearers include GPRS Tunneling Protocol (GTP) tunnel endpoint identifiers.

A specific format of the bearer setup request message or the UE context setup request message may be shown in Table 11.

TABLE 11

Bearer setup list

> Identifier of a PDU session to which the bearers belong
>> QoS parameter of the PDU session (a PDU session AMBR)
>>> Identifiers of the bearers
>>>> QoS parameters of the bearers
>>>> Uplink transmission link addresses of the bearers
UE-related configuration information of the bearers
Configuration parameters of the bearers on the DU It should be understood that the bearer setup request message or the UE context setup request message may further include a UE-level parameter (for example, an AMBR of the UE) and a slice-level parameter (for example, an AMBR of a slice), in addition to the parameters shown in Table 11.

After receiving the bearer setup request message sent by the CU, the DU configures an L1 layer and/or an L2 layer on a DU side based on the configuration parameters of the bearers on the DU included in the bearer setup request message.

1005. The DU sends UE-related configuration information of the bearers to UE.

Specifically, the UE-related configuration information of the bearers may be a Radio Resource Control connection reconfiguration message.

The Radio Resource Control connection reconfiguration message includes UE-related configuration information of the bearers.

1006. The UE configures the bearer 1 and the bearer 2 based on the UE-related configuration information of the bearers.

The UE configures the bearers based on the UE-related configuration information of the bearers that is in the Radio Resource Control connection reconfiguration message.

1007. The UE sends a radio resource control (RRC) connection reconfiguration complete message to the DU.

After configuring the bearers, the UE feeds back the radio resource control connection reconfiguration complete message to the DU.

1008. The DU sends a bearer setup complete message to the CU.

The DU may send the bearer setup complete message to the CU, or may send a UE context setup complete message to the CU.

After receiving the radio resource control connection reconfiguration complete message fed back by the CU, the DU feeds back the bearer setup complete message to the CU. The bearer setup complete message includes downlink transmission link addresses (including GTP tunnel endpoint identifiers) of the bearers and the like.

It should be understood that step 1004 to step 1008 are optional. When the bearers have not been established, step 1004 to step 1008 may be performed to establish the bearers. If the bearers have been established, the bearers may be directly scheduled after step 1003 is performed.

Optionally, if the bearers have been established, after performing step 1003, the CU may send a bearer modification message to the DU to modify the bearers. For example, the CU may modify some QoS parameters of the bearers, or add a QoS data flow to the bearers or remove a QoS data flow from the bearers. After the bearers are modified, modified bearers may be scheduled.

It should be understood that, on the foregoing basis, the DU may alternatively schedule the bearers based on a UE-level parameter, a PDU session-level parameter, and the QoS parameters of the bearers.

Specifically, the scheduling, by the DU, the bearers may be classified into uplink data scheduling for the bearers and downlink data scheduling for the bearers.

Downlink data scheduling for the bearers:

The DU receives downlink data sent by a core network through a session tunnel. Then, an SDAP layer of the DU maps the QoS data flows to the bearers by identifying the QFIs, and transfers the data to a PDCP layer. The PDCP layer performs encryption, integrity protection, and the like, and then sends the data to the corresponding bearers between the DU and the UE.

Uplink data scheduling for the bearers:

After receiving uplink data on the bearers, the DU sends data packets to the CU based on the uplink transmission link addresses (including the GTP tunnel endpoint identifiers) of the bearers. After receiving the data packets on the bearers, the CU sends the data packets to the core network through PDU session tunnels corresponding to the bearers.

In addition, when generating the QoS parameters of the bearers in step 1003, the CU may also generate uplink scheduling information of the bearers. The uplink scheduling information may include a logical channel, a logical channel scheduling priority, and the like. The CU adds the uplink scheduling information to the configuration parameters of the bearers on the DU and UE-related configuration parameters of the bearers. After obtaining the uplink scheduling information, the DU and the UE may transmit the uplink data based on the uplink scheduling information, and send an uplink mapping relationship between the QoS data flows and the bearers to the UE. Usually, uplink data and downlink data of one QoS data flow are mapped to a same bearer.

For example, the UE maps the QoS data flows to the corresponding bearers based on the uplink mapping relationship between the QoS data flows and the bearers, and adds the DFIs. The DU allocates an uplink (UL) grant to the UE based on the uplink scheduling information. After receiving the uplink grant, the UE preferentially allows a bearer with a higher logical channel priority to use the uplink grant, and preferentially sends data on a bearer with a higher priority. In addition, after receiving the uplink data, the DU sends the uplink data to the CU through an uplink GTP tunnel. The CU identifies the bearer based on a TEID of the uplink GTP tunnel. After performing data decryption or integrity check on the bearer, a PDCP layer of the CU transfers the data to an SDAP layer. The SDAP layer identifies a data flow based on a DFI in a data packet header, identifies session information based on the DFI, and sends the data to the core network through a tunnel corresponding to the session.

The DU may further schedule the bearers based on parameters such as a 5QI, an ARP, a GBR, and a maximum bit rate (MBR). For example, when the 5QI includes priority levels of different bearers, the DU may preferentially schedule a bearer with a higher priority. When the 5QI includes a packet delay budget and a data packet error rate, the DU may control data transmission of the bearers, so that the data transmission of the bearers meets requirements on the packet delay and the data packet error rate.

Figure 11A:
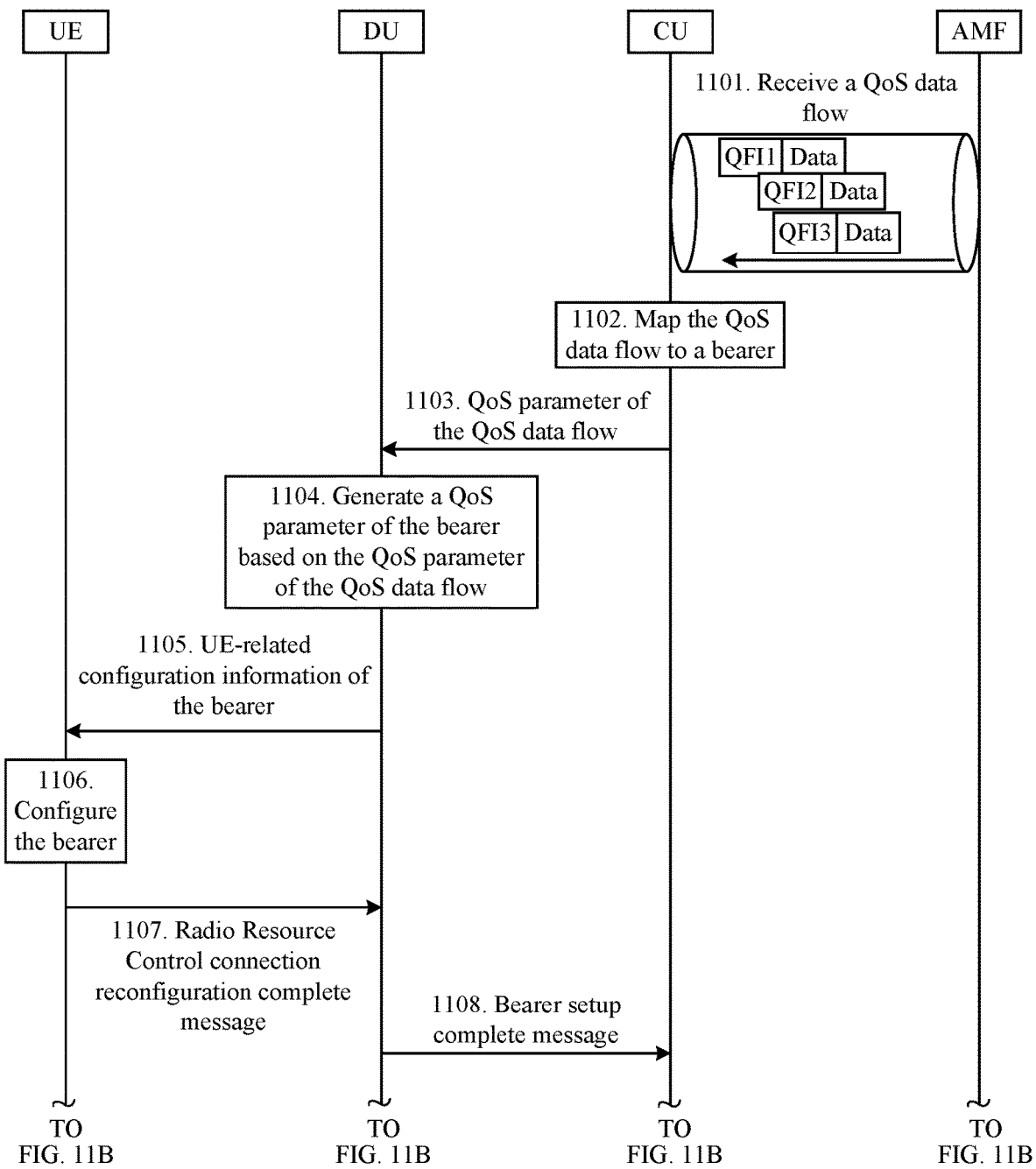
FIG. 11A and FIG. 11B are a flowchart of a communication method according to an embodiment of this application.
Figure 11B:
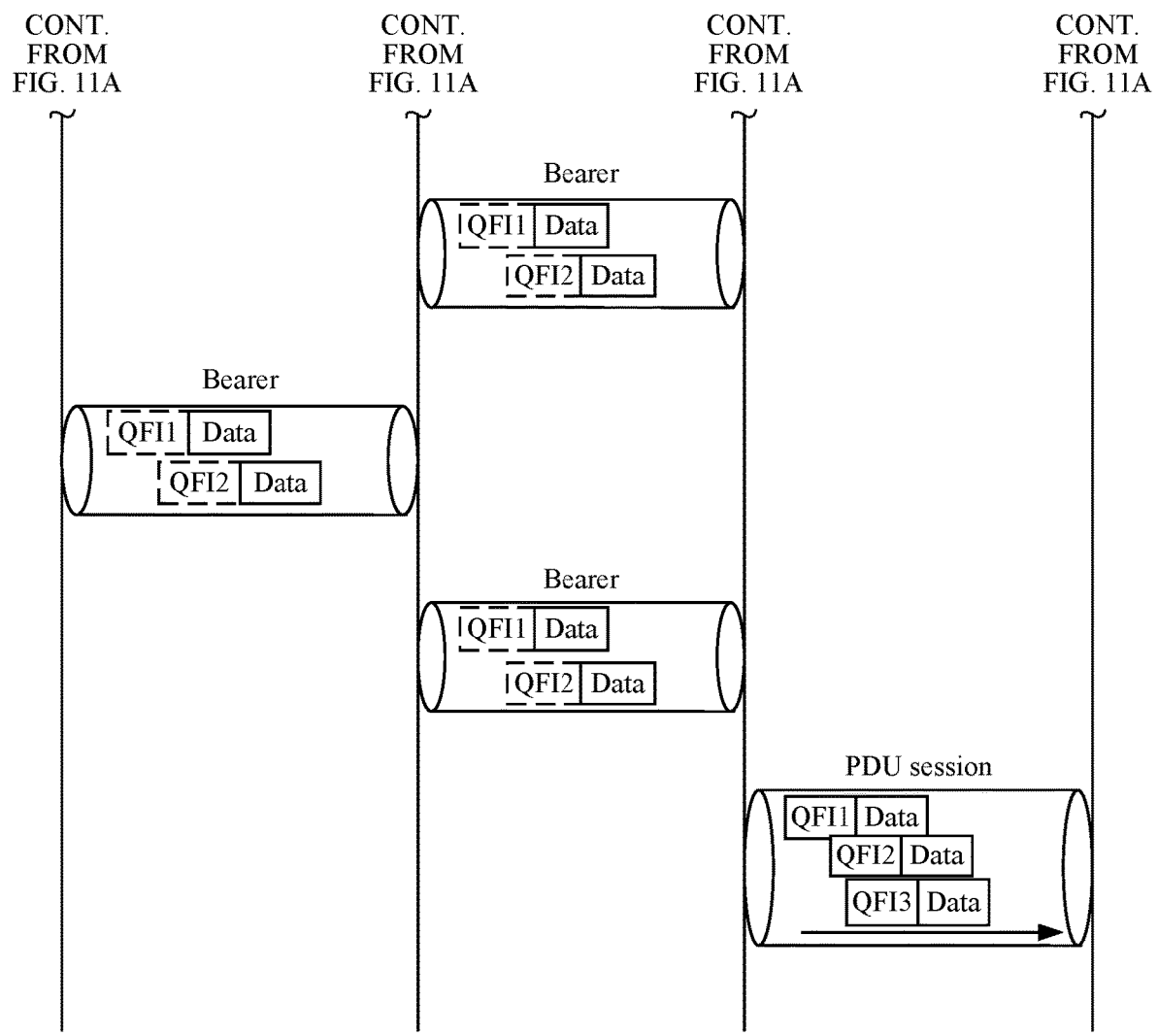

FIG. 11A and FIG. 11B are a flowchart of a communication method according to an embodiment of this application. The method in FIG. 11A and FIG. 11B includes the following steps.

1101. A CU receives a QoS data flow sent by a core network.

1102. The CU maps a flow 1 and a flow 2 to a bearer 1, and maps a flow 3 to a bearer 2.

1103. The CU sends a QoS parameter of the QoS data flow to a DU.

Specifically, QoS parameters of the bearers may be carried in a bearer setup request message or a UE context setup request message sent by the CU.

A format of the bearer setup request message or the UE context setup request message may be specifically a form shown in Table 12.

TABLE 12

Bearer setup list

> Identifier of a PDU session to which the bearers belong
>> QoS parameter of the PDU session (a PDU Session AMBR)
>>> Identifiers of the bearers
>>> List of QoS flows included in the bearers
>>>> QoS parameters of the QoS flows
>>>> Uplink transmission link addresses of the bearers
UE-related configuration information of the bearers
Configuration parameters of the bearers on the DU

1104. The DU generates a QoS parameter of the bearer 1 based on QoS parameters of the flow 1 and the flow 2, and generates a QoS parameter of the bearer 2 based on a QoS parameter of the flow 3.

In the method in FIG. 10A and FIG. 10B, the CU generates the QoS parameters of the bearers based on the QoS data flows; however, in the method in FIG. 11A and FIG. 11B, the DU generates the QoS parameters of the bearers based on the QoS data flows. In addition, before generating the QoS parameters of the bearers based on the QoS data flows, the DU may first obtain mapping information between the QoS data flows and the bearers from the CU. Specifically, before step 1103, the DU obtains the mapping information from the CU (or the CU may directly notify the DU of the mapping information), that is, the DU learns, from the CU, that the flow 1 and the flow 2 are mapped to the bearer 1 and the flow 3 is mapped to the bearer 2.

1105. The DU sends a Radio Resource Control connection reconfiguration message to UE.

1106. The UE configures the bearer 1 and the bearer 2 based on the Radio Resource Control connection reconfiguration message.

1107. The UE sends a Radio Resource Control connection reconfiguration complete message to the DU.

1108. The DU sends a bearer setup complete message to the CU.

Similar to the method in FIG. 10A and FIG. 10B, step 1104 to step 1108 are optional. When the bearers have not been established, step 1104 to step 1108 may be performed to establish the bearers. If the bearers have been established, the bearers may be directly scheduled after step 1103 is performed.

It should be understood that, on the foregoing basis, the DU may alternatively schedule the bearers based on a UE-level parameter, a PDU session-level parameter, and the QoS parameters of the bearers.

For a specific process of scheduling the bearers by the DU, refer to the scheduling the bearers by the DU in the method shown in FIG. 10A and FIG. 10B. Details are not described herein again.

Figure 12:
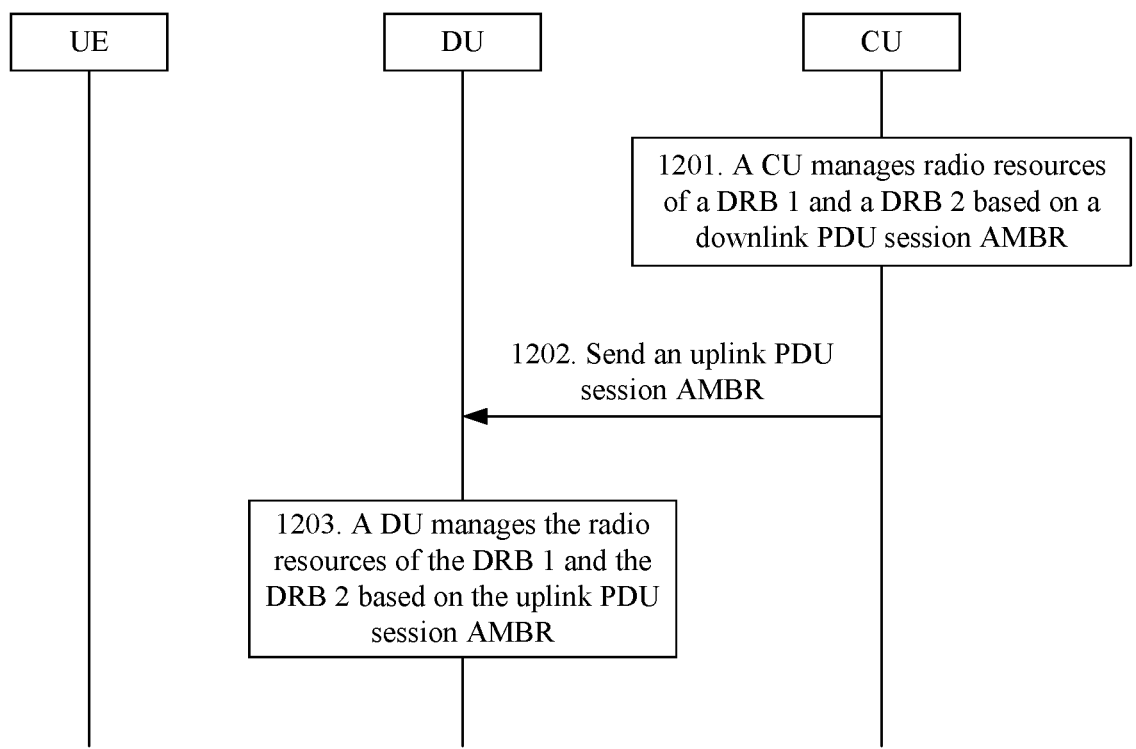
FIG. 12 is a flowchart of a communication method according to an embodiment of this application.
Figure 13:
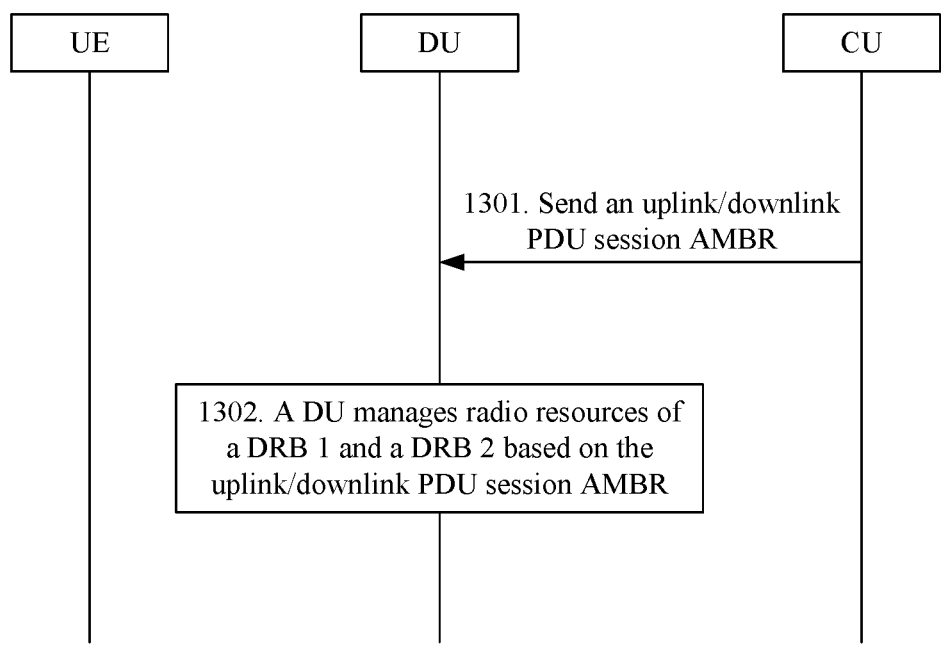
FIG. 13 is a flowchart of a communication method according to an embodiment of this application.

In this application, the DU may schedule the bearers based on bearer-level QoS parameters, or may perform corresponding scheduling based on parameters at other levels (such as a slice-level parameter, the UE-level parameter, and the PDU session-level parameter). With reference to FIG. 12 and FIG. 13, the following uses a PDU session AMBR as an example to describe in detail a PDU session scheduling process when data bearers include a bearer 1 and a bearer 2.

FIG. 12 is a flowchart of a communication method according to an embodiment of this application. The method in FIG. 12 includes the following steps.

1201. A CU manages radio resources of a bearer 1 and a bearer 2 based on a downlink PDU session AMBR.

Specifically, the CU controls a downlink data transmission rate of a PDU session based on the downlink PDU session AMBR, so that a sum of downlink data transmission rates of the bearer 1 and the bearer 2 in the PDU session does not exceed the downlink PDU session AMBR.

1202. The CU sends an uplink PDU session AMBR to a DU.

1203. The DU manages the radio resources of the bearer 1 and the bearer 2 based on the uplink PDU session AMBR.

Specifically, the DU controls an uplink data transmission rate of the PDU session based on the uplink PDU session AMBR, so that a sum of uplink data transmission rates of the bearer 1 and the bearer 2 in the PDU session does not exceed the uplink PDU session AMBR.

In the communication method shown in FIG. 12, the CU controls the uplink data transmission rate of the PDU session, and the DU controls the downlink data transmission rate of the PDU session. Optionally, the CU may alternatively send both the uplink PDU session AMBR and the downlink PDU session AMBR to the DU, so that the DU controls uplink and downlink data transmission of the PDU session.

FIG. 13 is a flowchart of a communication method according to an embodiment of this application. The method in FIG. 13 includes the following steps:

1301. A CU sends an uplink PDU session AMBR and a downlink PDU session AMBR to a DU.

1302. The DU manages radio resources of a bearer 1 and a bearer 2 based on the uplink PDU session AMBR and the downlink PDU session AMBR.

Specifically, the DU controls an uplink data transmission rate of a PDU session based on the uplink PDU session AMBR, and controls a downlink data transmission rate of the PDU session based on the downlink PDU session AMBR, so that a sum of uplink data transmission rates of the bearer 1 and the bearer 2 in the PDU session does not exceed the uplink PDU session AMBR, and a sum of downlink data transmission rates of the bearer 1 and the bearer 2 does not exceed the downlink PDU session AMBR.

The foregoing describes in detail the communication methods in the embodiments of this application with reference to FIG. 1 to FIG. 13. The following describes a base station, a terminal device, and a communications apparatus in the embodiments of this application with reference to FIG. 14 to FIG. 19. It should be understood that the base station, the terminal device, and the communications apparatus in FIG. 14 to FIG. 19 can implement corresponding steps in the communication methods in FIG. 1 to FIG. 13. For brevity, repeated descriptions are properly omitted in the following.

Figure 14:
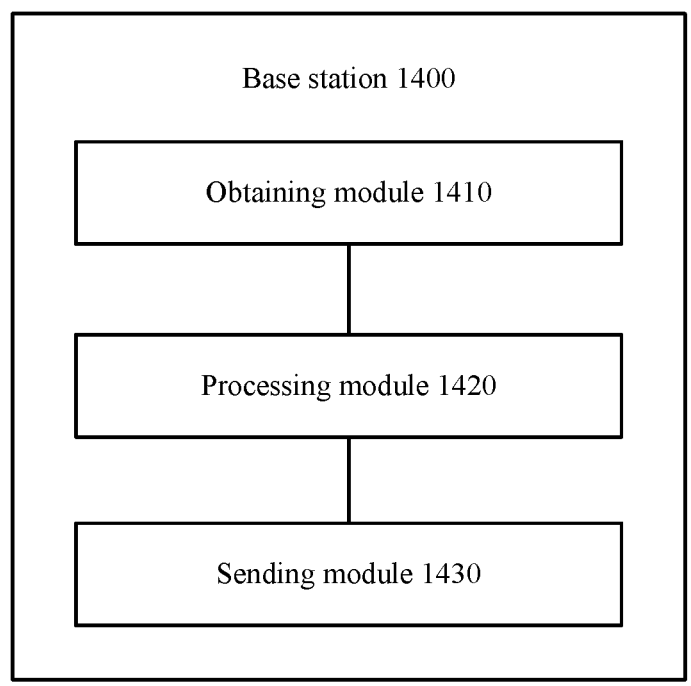
FIG. 14 is a schematic block diagram of a base station according to an embodiment of this application.

FIG. 14 is a schematic block diagram of a base station 1400 according to an embodiment of this application. The base station 1400 includes:

an obtaining module 1410, configured to obtain a quality of service QoS parameter of a QoS data flow;

a processing module 1420, configured to determine mapping information between the QoS data flow and a bearer based on the QoS parameter of the QoS data flow, where the processing module 1420 is further configured to determine a QoS parameter of the bearer based on the QoS parameter of the QoS data flow; and a sending module 1430, configured to send the QoS parameter of the bearer to a distributed unit DU.

Optionally, in an embodiment, the processing module 1420 is specifically configured to determine the mapping information between the QoS data flow and the bearer based on a result of comparison on the QoS parameter of the QoS data flow.

Optionally, in an embodiment, there is a mapping relationship between the bearer and a plurality of data flows in the QoS data flow, and the processing module 1420 is specifically configured to: select the QoS parameter of the bearer from QoS parameters of the plurality of data flows; or calculate the QoS parameter of the bearer based on QoS parameters of the plurality of data flows.

Optionally, in an embodiment, the sending module 1430 is further configured to send a first message to the DU, where the first message includes the QoS parameter of the bearer and/or the mapping information between the QoS data flow and the bearer, and the first message is used to request the DU to establish the bearer between the DU and user equipment UE.

Optionally, in an embodiment, the sending module 1430 is further configured to send a bearer modification message to the DU, where the bearer modification message includes at least one of first information and second information, the first information is a modified QoS parameter of the bearer, and the second information is used to add a QoS data flow to the bearer or remove a QoS data flow from the bearer.

Optionally, in an embodiment, the processing module 1420 is specifically configured to determine, at a Service Data Adaptation Protocol SDAP layer, the mapping information between the QoS data flow and the bearer.

Optionally, in an embodiment, the obtaining module 1410 is further configured to obtain a non-QoS-data-flow-level QoS parameter, where the non-QoS-data-flow-level QoS parameter includes any one of a slice-level QoS parameter, a UE-level QoS parameter, and a packet data unit PDU session-level QoS parameter; and the sending module 1430 is further configured to send the first parameter to the DU.

Optionally, in an embodiment, the obtaining module 1410 is further configured to obtain a non-QoS-data-flow-level QoS parameter, where the non-QoS-data-flow-level QoS parameter includes any one of a slice-level QoS parameter, a UE-level QoS parameter, and a packet data unit PDU session-level QoS parameter; and the processing module 1420 is specifically configured to control, based on the non-QoS-data-flow-level QoS parameter, data transmission of any one of a slice, a UE, and a PDU session.

Figure 15:
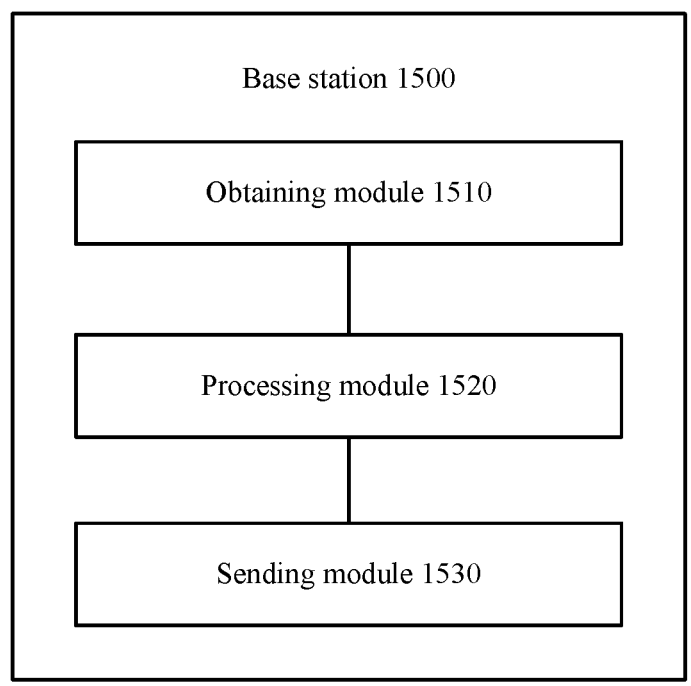
FIG. 15 is a schematic block diagram of a base station according to an embodiment of this application.

FIG. 15 is a schematic block diagram of a base station 1500 according to an embodiment of this application. The base station 1500 includes:

an obtaining module 1510, configured to obtain a quality of service QoS parameter of a QoS data flow;

a processing module 1520, configured to determine mapping information between the QoS data flow and a bearer based on the QoS parameter of the QoS data flow; and a sending module 1530, configured to send, to a distributed unit DU, the QoS parameter of the QoS data flow and the mapping information between the QoS data flow and the bearer.

Optionally, in an embodiment, the processing module 1520 is specifically configured to determine the mapping information between the QoS data flow and the bearer based on a result of comparison on the QoS parameter of the QoS data flow.

Optionally, in an embodiment, the sending module 1530 is further configured to send a first message to the DU, where the first message includes the QoS parameter of the QoS data flow and/or the mapping information between the QoS data flow and the bearer, and the first message is used to request the DU to establish the bearer between the DU and user equipment UE.

Optionally, in an embodiment, the sending module 1530 is further configured to send a bearer modification message to the DU, where the bearer modification message includes at least one of first information and second information, the first information is a modified QoS parameter of the bearer, and the second information is used to add a QoS data flow to the bearer or remove a QoS data flow from the bearer.

Optionally, in an embodiment, the processing module 1520 is specifically configured to determine, at a Service Data Adaptation Protocol SDAP layer, the mapping information between the QoS data flow and the bearer.

Optionally, in an embodiment, the obtaining module 1510 is further configured to obtain a non-QoS-data-flow-level QoS parameter, where the non-QoS-data-flow-level QoS parameter includes any one of a slice-level QoS parameter, a UE-level QoS parameter, and a packet data unit PDU session-level QoS parameter.

Optionally, in an embodiment, the obtaining module 1510 is further configured to obtain a non-QoS-data-flow-level QoS parameter, where the non-QoS-data-flow-level QoS parameter includes any one of a slice-level QoS parameter, a UE-level QoS parameter, and a packet data unit PDU session-level QoS parameter.

Optionally, in an embodiment, the processing module 1520 is specifically configured to control, based on the non-QoS-data-flow-level QoS parameter, data transmission of any one of a slice, a UE, and a PDU session.

Figure 16:
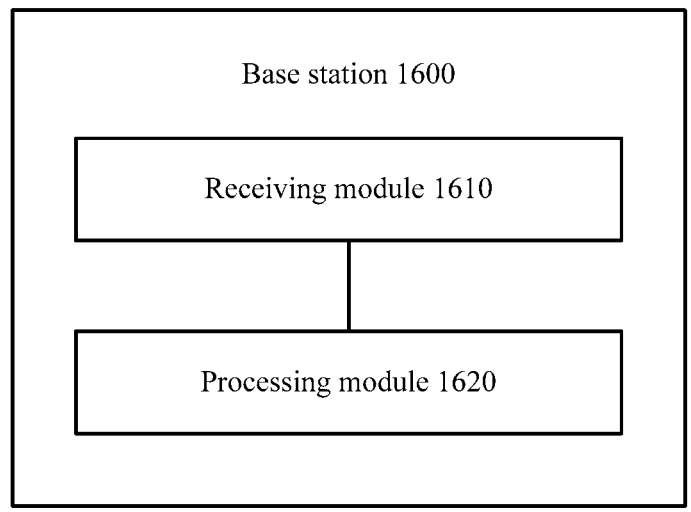
FIG. 16 is a schematic block diagram of a base station according to an embodiment of this application.

FIG. 16 is a schematic block diagram of a base station 1600 according to an embodiment of this application. The base station 1600 includes:

a receiving module 1610, configured to receive a QoS parameter of a bearer that is sent by a central unit CU, where the bearer is a bearer that is determined by the CU based on a QoS parameter of a QoS data flow and that has a mapping relationship with the QoS data flow, and the QoS parameter of the bearer is determined by the CU based on the QoS parameter of the QoS data flow; and a processing module 1620, configured to schedule the bearer based on the QoS parameter of the bearer.

Optionally, in an embodiment, mapping information is determined by the CU based on a result of comparison on the QoS parameter of the QoS data flow.

Optionally, in an embodiment, there is a mapping relationship between the bearer and a plurality of data flows in the QoS data flow, and the QoS parameter of the bearer is selected by the CU from QoS parameters of the plurality of data flows, or the QoS parameter of the bearer is obtained by the CU through calculation based on QoS parameters of the plurality of data flows.

Optionally, in an embodiment, the receiving module 1610 is further configured to receive a first message sent by the CU, where the first message includes the QoS parameter of the bearer and/or the mapping information between the QoS data flow and the bearer; and the processing module 1620 is specifically configured to establish the bearer between a DU and user equipment UE based on the first message.

Optionally, in an embodiment, the receiving module 1610 is further configured to receive a bearer modification message sent by the CU, where the bearer modification message includes at least one of first information and second information, the first information is a modified QoS parameter of the bearer, and the second information is used to add a QoS data flow to the bearer or remove a QoS data flow from the bearer.

Optionally, in an embodiment, the mapping information between the QoS data flow and the bearer is determined by the CU at a Service Data Adaptation Protocol SDAP layer.

Optionally, in an embodiment, the receiving module 1610 is further configured to receive a non-QoS-data-flow-level QoS parameter sent by the CU, where the non-QoS-data-flow-level QoS parameter includes any one of a slice-level QoS parameter, a UE-level QoS parameter, and a packet data unit PDU session-level QoS parameter; and the processing module 1620 is specifically configured to control, based on the non-QoS-data-flow-level QoS parameter, data transmission of any one of a slice, a UE, and a PDU session.

Figure 17:
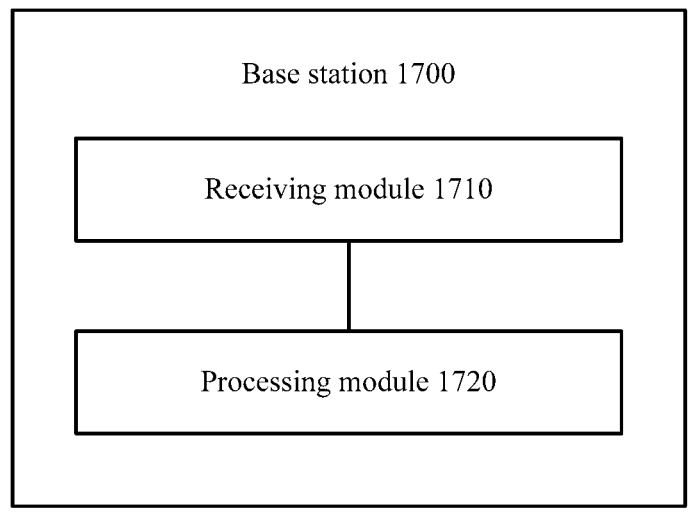
FIG. 17 is a schematic block diagram of a base station according to an embodiment of this application.

FIG. 17 is a schematic block diagram of a base station 1700 according to an embodiment of this application. The base station 1700 includes:

a receiving module 1710, configured to receive a QoS parameter of a QoS data flow and mapping information between the QoS data flow and the bearer, where the QoS parameter of the QoS data flow and the mapping information are sent by a central unit CU; and a processing module 1720, configured to schedule the bearer based on the QoS parameter of the QoS data flow and the mapping information between the QoS data flow and the bearer.

Optionally, in an embodiment, the mapping information is determined by the CU based on a result of comparison on the QoS parameter of the QoS data flow.

Optionally, in an embodiment, the receiving module 1710 is further configured to receive a first message sent by the CU, where the first message includes the QoS parameter of the QoS data flow and/or the mapping information between the QoS data flow and the bearer; and the processing module 1720 is specifically configured to establish the bearer between a DU and user equipment UE based on the first message.

Optionally, in an embodiment, the receiving module 1710 is further configured to receive a bearer modification message sent by the CU, where the bearer modification message includes at least one of first information and second information, the first information is a modified QoS parameter of the bearer, and the second information is used to add a QoS data flow to the bearer or remove a QoS data flow from the bearer.

Optionally, in an embodiment, the mapping information between the QoS data flow and the bearer is determined by the CU at a Service Data Adaptation Protocol SDAP layer.

Optionally, in an embodiment, the receiving module 1710 is further configured to receive a non-QoS-data-flow-level QoS parameter sent by the CU, where the non-QoS-data-flow-level QoS parameter includes any one of a slice-level QoS parameter, a UE-level QoS parameter, and a packet data unit PDU session-level QoS parameter; and the processing module 1720 is specifically configured to control, based on the non-QoS-data-flow-level QoS parameter, data transmission of any one of a slice, a UE, and a PDU session.

Figure 18:
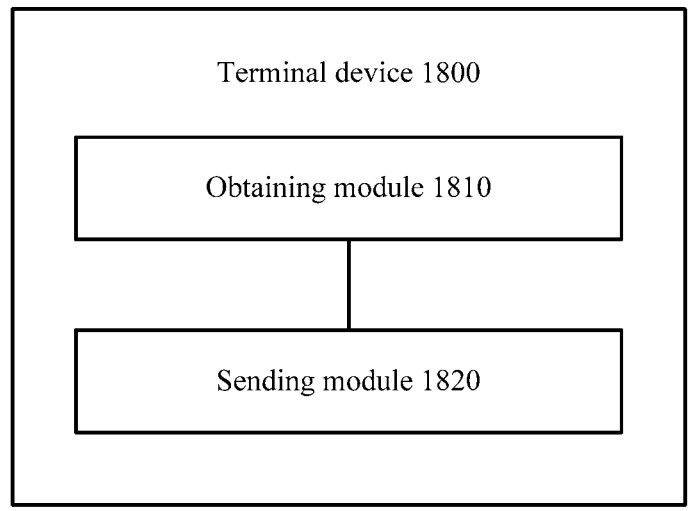
FIG. 18 is a schematic block diagram of a terminal device according to an embodiment of this application.

FIG. 18 is a schematic block diagram of a terminal device 1800 according to an embodiment of this application. The terminal device 1800 includes:

an obtaining module 1810, configured to obtain mapping information between a QoS data flow and a bearer, where the mapping information is determined by a CU based on a QoS parameter of the QoS data flow; and a sending module 1820, configured to send uplink data to a DU based on a mapping relationship between the QoS data flow and the bearer.

Optionally, in an embodiment, the obtaining module 1810 is specifically configured to: receive a Radio Resource Control connection reconfiguration message sent by the DU; and obtain the mapping relationship between the QoS data flow and the bearer from the Radio Resource Control connection reconfiguration message.

Optionally, in an embodiment, the terminal device 1800 further includes: a receiving module 1830, configured to receive a bearer modification message sent by the DU, where the bearer modification message includes at least one of first information and second information, the first information is a modified QoS parameter of the bearer, and the second information is used to add a QoS data flow to the bearer or remove a QoS data flow from the bearer; and a processing module 1840, configured to determine the QoS parameter of the bearer based on the bearer modification message, and/or add a QoS data flow to the bearer or remove a QoS data flow from the bearer based on the bearer modification message.

An embodiment of this application further includes a base station. The base station includes the foregoing CU and DU.

It should be understood that the base station herein may be a base station or a device having a similar function in various systems. The base station may also be an eNB in an LTE system, a gNB in a new radio (NR) system, a controller, or the like.

Figure 19:
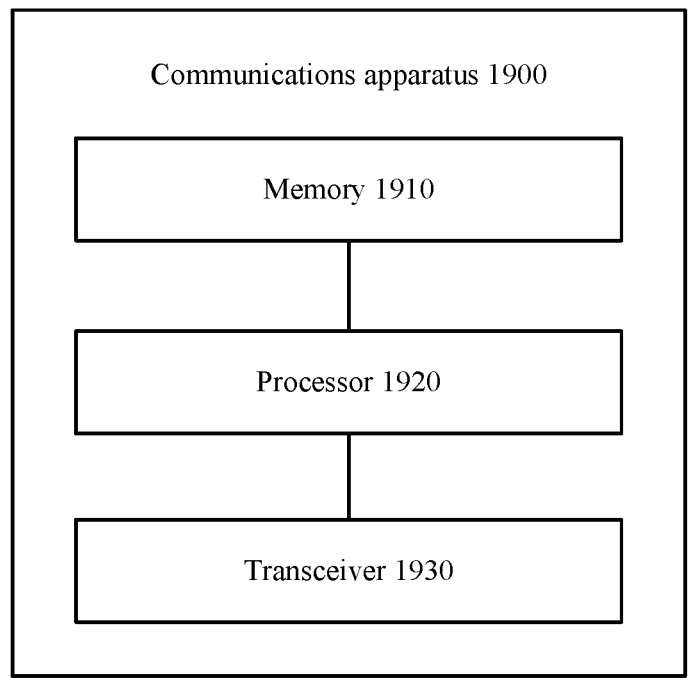
FIG. 19 is a schematic block diagram of a communications apparatus according to an embodiment of this application.

FIG. 19 is a schematic block diagram of a communications apparatus 1900 according to an embodiment of this application. The communications apparatus 1900 includes:

a memory 1910, configured to store a program;

a processor 1920; and a transceiver 1930, where when the program stored in the memory is executed by the processor 1920, the processor 1920 and the transceiver 1930 can implement the processes in the foregoing communication methods.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
obtaining, by a central unit (CU), a quality of service (QoS) parameter of a first QoS data flow;
performing, by the CU based on the QoS parameter of the first QoS data flow, mapping between the first QoS data flow and a bearer to form a mapping relationship;
determining, by the CU, a QoS parameter of the bearer based on the QoS parameter of the first QoS data flow;
sending, by the CU, a context setup request message to a distributed unit (DU), wherein the context setup request message comprises the QoS parameter of the bearer, the QoS parameter of the first QoS data flow and the mapping relationship, the CU and the DU are comprised in a base station, the context setup request message enables the DU to control data transmission on the bearer based on the QoS parameter of the bearer; and
sending, by the CU, a message for bearer modification to the DU, wherein the message for bearer modification comprises a first information configured to add a second QoS data flow to the bearer.

2. The method according to claim 1, wherein the method further comprises:
receiving, by the DU, the context setup request message from the CU.

3. The method according to claim 1, wherein the method further comprises:
   sending, by core network to the CU, a QoS data flow identifier (ID) and a mapping between the QoS data flow ID and the QoS parameter of the first QoS data flow.

4. The method according to claim 3, wherein the method further comprises:
   receiving, by the CU from the core network, the QoS data flow ID and the mapping.

5. The method according to claim 1, wherein the mapping between the first QoS data flow and the bearer is performed by the CU at a service data adaptation protocol (SDAP) layer.

6. The method according to claim 1, wherein the message for bearer modification further comprises second information configured to modify the QoS parameter of the bearer.

7. The method according to claim 1, wherein the method further comprises:
   receiving, by the DU, the message for bearer modification from the CU.

8. The method according to claim 1, wherein the CU comprise s functions of packet data convergence protocol (PDCP), radio resource control (RRC) protocol, and service data adaptation protocol (SDAP); and the DU comprises functions of radio link control (RLC) protocol, medium access control (MAC) protocol, and a physical layer protocol.

9. The method according to claim 1, wherein the method further comprises:
   controlling, by the DU, data transmission on the bearer based on the QoS parameter of the bearer.

10. A communication method, comprising:
    receiving, by a distributed unit (DU), a context setup request message from a central unit (CU), wherein the context setup request message comprises a quality of service (QoS) parameter of a bearer, a QoS parameter of a first QoS data flow and a mapping relationship between the first QoS data flow and the bearer, the CU and the DU are comprised in a base station, the context setup request message enables the DU to control data transmission on the bearer based on the QoS parameter of the bearer;
    receive, by the DU, a message for bearer modification from the CU, wherein the message for bearer modification comprises a first information configured to add a second QoS data flow to the bearer; and
    controlling, by the DU, data transmission on the bearer based on the QoS parameter of the bearer.

11. The method according to claim 10, wherein the message for bearer modification further comprises second information configured to modify the QoS parameter of the bearer.

12. The method according to claim 10, wherein the CU comprises functions of packet data convergence protocol (PDCP), radio resource control (RRC) protocol, and service data adaptation protocol (SDAP); and the DU comprises functions of radio link control (RLC) protocol, medium access control (MAC) protocol, and a physical layer protocol.

13. A communications system, comprising a central unit (CU) and a distributed unit (DU), wherein the CU and the DU are comprised in a base station, and wherein the CU comprises at least a first processor and a first non-transitory computer readable medium, the first non-transitory computer readable medium stores first programming instructions, when executed by the at least the first processor, the first programming instructions instruct the CU to:
   obtain a quality of service (QoS) parameter of a first QoS data flow;
   perform, based on the QoS parameter of the first QoS data flow, mapping between the first QoS data flow and a bearer to form a mapping relationship;
   determine a QoS parameter of the bearer based on the QoS parameter of the first QoS data flow corresponding to the bearer;
   send a context setup request message to the DU, wherein the context setup request message comprises the QoS parameter of the bearer, the QoS parameter of the first QoS data flow and the mapping relationship, the CU and the DU are included in a base station, the context setup request message enables the DU to control data transmission on the bearer based on the QoS parameter of the bearer; and
   send a message for bearer modification to the DU, wherein the message for bearer modification comprises a first information configured to add a second QoS data flow to the bearer.

14. The system according to claim 13, wherein the DU comprises at least a second processor and a second non-transitory computer readable medium, the second non-transitory computer readable medium stores second programming instructions, when executed by the at least the second processor, the second programming instructions instruct the DU to:
   receive the context setup request message from the CU.

15. The system according to claim 13, wherein the system further comprises a core network, the core network comprises at least a third processor and a third non-transitory computer readable medium, the third non-transitory computer readable medium stores third programming instructions, when executed by the at least the third processor, the third programming instructions instruct the core network to:
   send to the CU a QoS data flow identifier (ID) and a mapping between the QoS data flow ID and the QoS parameter of the first QoS data flow.

16. The system according to claim 15, wherein the first programming instructions further instruct the CU to:
   receive the QoS data flow ID and the mapping from the core network.

17. The system according to claim 13, wherein the mapping between the first QoS data flow and the bearer is performed by the CU at a service data adaptation protocol (SDAP) layer.

18. The system according to claim 13, wherein the message for bearer modification further comprises second information configured to modify the QoS parameter of the bearer.

19. The system according to claim 13, wherein the CU comprise s functions of packet data convergence protocol (PDCP), radio resource control (RRC) protocol, and service data adaptation protocol (SDAP); and the DU comprises functions of radio link control (RLC) protocol, medium access control (MAC) protocol, and a physical layer protocol.

20. The system according to claim 14, wherein the second programming instructions further instruct the DU to:
   control data transmission on the bearer based on the QoS parameter of the bearer.

* * * * *